United States Patent [19]
Schauss et al.

[11] Patent Number: 5,181,201
[45] Date of Patent: Jan. 19, 1993

[54] INTERFACE CHIP DEVICE

[75] Inventors: Craig A. Schauss, Decatur, Ind.; Donald E. Neumann, Huntington Woods; Dennis A. Bielawski, Romeo, both of Mich.

[73] Assignee: General Dynamics Land Systems Inc., Warren, Mich.

[21] Appl. No.: 645,901

[22] Filed: Jan. 30, 1991

Related U.S. Application Data

[63] Continuation-in-part of Ser. No. 476,607, Feb. 7, 1990, abandoned.

[51] Int. Cl.$^5$ .............................................. H04J 3/02
[52] U.S. Cl. .................................................. 370/85.1
[58] Field of Search ........................................ 370/85.1

[56] References Cited

U.S. PATENT DOCUMENTS 4,471,489  9/1984  Konetski et al. ............... 375/8
4,816,823  3/1989  Polkinghorne et al. ......... 370/85.1
4,942,571  7/1990  Möller et al. ..................... 370/85.1

Primary Examiner—Douglas W. Olms
Assistant Examiner—Russell W. Blum
Attorney, Agent, or Firm—Brooks & Kushman

[57] ABSTRACT

An interface chip device, provided for use in a time-division multiplex serial data bus system is operable in a processor interface mode and at least one remote mode wherein the device is capable of directly interfacing with I/O devices. The system does not require software or processing capability for protocol communications or I/O control and, consequently, the communications protocol is transparent to the user, system developer or programmer. The communication protocol of the bus system includes a plurality of commands such that when in the remote mode, the chip device determines the validity of each of the commands and provides an echo response message on the data bus in response to each of the commands except for a broadcast command. The remote modes of the chip device include a remote switch mode, a data input mode, a data output mode or a combination of the remote modes. The chip device is divided into six main functional areas: encoder/decoder, message analyzer, protocol sequencer, data storage, control timers, and input/output controller. The chip device may be used in small remote modules that are located in convenient locations adjacent to the loads they are controlling or switching. The remote modules are controlled by messages from a multiplex data bus controller which are formatted through the communications protocol of the data bus system. The chip device is designed to handle the communications protocol of the data bus system and provide interface between the data bus and other electronic hardware elements.

13 Claims, 15 Drawing Sheets

INTERFACE CHIP DEVICE

CROSS REFERENCE TO RELATED APPLICATIONS

This application is a continuation-in-part of application with the Ser. No. 476,607 filed Feb. 7, 1990, now abandoned.

TECHNICAL FIELD

This invention relates to interface chip devices for use in time-division multiplex serial data bus systems and, in particular, to interface chip devices for use in time-division multiplex data bus systems having multiple operating modes.

BACKGROUND ART

Time-division multiplex is the transmission of information from several signal channel subsystems through one communication bus with different channel samples staggered in time to form a composite pulse train. A remote terminal or module is the name commonly given the electronics necessary to provide an interface between the bus and a subsystem. A bus controller is the electronics that serve the function of commanding, scanning and monitoring "bus traffic" to prevent overlap and erroneous communications.

The electronic battlefield of the future represents an environment in which vast amounts of data from a multitude of sources requires processing. Mission success and combat effectiveness of weapon systems depends on the ability to distribute and process data within limited space constraints.

Today's combat vehicles have a centralized power distribution system which occupies a large volume and, consequently, limits the space for electronic enhancements to the vehicle. The centralized nature of the conventional system results in large distribution boxes and long cable runs that increase the system's weight, size, cost and vulnerability. Conventional point-to-point discrete wiring approaches result in severe limitations to the continued expansion of electronic and electrical equipment. This problem applies to both signal and power circuits.

Consequently, instead of one centralized distribution center, there is a need for a single interface chip device which can be placed at intermediate locations in remote modules to control power and/or collect and distribute information to eliminate the need to discretely wire remote locations directly to the distribution center.

The U.S. Pat. No. 4,136,400 to Caswell et al. discloses a microprocessor-based CMOS chip which has a bus controller mode and a remote terminal mode and which operates in a time-division multiplex serial data bus system. The chip is capable of satisfying the performance requirements of military standard 1553A which relates to serial data bus systems. A data format encoder and data format decoder provide means to convert from Manchester bi-phase data to NRZ data for receiving data from the data bus and to make the opposite conversion for transmitting data over the data bus.

The Caswell chip is a programmable chip that can (along with a Control ROM and Subsystem) implement the MIL-STD-1553 requirement for serial data bus communications. The device does not contain any logic that would allow it to directly interface with I/O devices. The device requires a processor, memory, software, and subsystem hardware if it were to interface to switches, sensors, A-to-D converters, etc.

Protocol interpretation as provided by the Caswell patent is handled by the external ROM and a subsystem coupled to the chip. A microprocessor is required in the subsystem hardware to utilize the data from the data terminal chip. This is possible since military standard 1553A is directly used to interconnect several complex microprocessor-based subsystems within a military aircraft.

The U.S. Pat. No. 4,471,489 to Konetski discloses an electronic circuit which automatically switches a telephone modem to a receive or transmit mode. Modems are used in data communication systems to transfer data between two or more computers. The circuit has no capability to interface with anything other than standard computer interfaces such as RS-232.

The U.S. Pat. No. 4,453,229 to Schaire discloses a bus interface unit capable of handling the protocol of a wide variety of flexible bus communication message formats and data transfer algorithms. The unit is capable of operating in either a bus controller or a terminal mode. In the bus controller mode, the unit initiates inner subsystem messages. In the remote terminal mode, the unit responds in a predetermined manner to commands from another similar unit acting as a bus controller.

The U.S. Pat. No. 4,794,525 to Pickert et al. discloses external interface control circuitry which couples a microcomputer system to an external device. The control circuitry includes a microcomputer or power switch for supplying power to the external device in response to a PSC signal and bus control for gating interface signals from the microcomputer with a PD signal for application to the external device.

The U.S. Pat. No. 4,547,880 to DeVita discloses a communication control apparatus for interconnecting a large number of user terminals, main frame computer system, microcomputers, remote digital devices and the like using some of the concepts inherent in statistical multiplexers, intelligent switches and local area network devices implemented in a relatively compact configuration.

The U.S. Pat. No. 4,554,657 to Wilson discloses a multiplex bus including a bus controller for controlling the traffic on a multiplex bus network. The bus controller can address a remote control terminal to activate one of a plurality of extended buses and then address the remote terminals thereon.

Motorola data sheet for the MC68561 describes a multi-protocol communications controller (MPCC) which interfaces a single serial communications channel to an MC68008/MC6800 microcomputer-based system. The device is used to send data from one microprocessor to another microprocessor. The device does not have a means to directly interface to input-output devices.

The U.S. Pat. No. 4,331,835 to Gueldner et al. discloses an interface unit for modular telecommunication systems. Data transfer across an interlink bus is performed under control of an interlink bus controller. Data characters are transmitted in time multiplex mode. A receiving unit stores data in a buffer memory immediately before translating the same to an associated switching block.

Other U.S. prior art patents of a more general interest include U.S. Pat. Nos. 3,978,454, 4,137,565, 4,245,301, 4,287,563, 4,344,127, 4,371,932, 4,451,881 and 4,507,781.

A typical prior art bus controller includes a microprocessor along with specific application software to perform the bus control functions. The processor and software determine when data is to be transmitted and what to do with particular data that is received. Bus interface logic is in control of getting data from one location to another when told to by the microprocessor. The BUS interface logic consists of serial bus drivers/receivers, encoders/decoders, data error detection (parity checks), and data storage. The Bus interface hardware must be capable of receiving and storing data from the processor prior to transmission. It must also store data received from the serial bus and make it available to the processor.

A typical bus operates in the remote mode much the same way that it does in the bus controller mode. The Bus interface logic receives the serial data and converts it into parallel data. In some systems (i.e. Motorola MC68561) this data would simply be made available to a local microprocessor and application software. The Bus Interface would wait to be told what to do next.

In other systems, such as the Caswell chip, the received data may be interpreted by the Bus interface logic and then loaded in external dual port memory. Depending on the type of message received the Bus interface logic could respond with an echo which contains data from a location within the external memory. The data in this memory would be placed there or read by a local microprocessor running application software. Depending on the data received and the application software, the microprocessor could instruct the remote node's support hardware to perform an input or output function. After processing the results of this input or output function the processor could place new data in the dual port memory. In any case, the subsystem in a typical command response communications system must have a microprocessor and memory to make any use of the data received from the serial bus. In other words, the Motorola and Caswell devices essentially just control data communications between multiple microprocessors.

SUMMARY OF THE INVENTION

An advantage of the present invention is a single interface chip device for use in a time-division multiplex serial data bus system having a communications protocol wherein the interface chip implements substantially all of the communications protocol without the need for external memory or processing control.

Another advantage of the present invention is a single interface chip device for use in a time-division multiplex serial data bus system wherein the chip is configurable in a processor interface mode or in any one or more of three remote modes including a remote switch mode, a data input mode and a data output mode.

Yet still another advantage of the present invention is a single interface chip device for use in a time-division multiplex serial data bus system wherein the device is capable of directly interfacing to several standard input/output peripheral devices without requiring microprocessor or complex "glue" logic. The device is relatively small in size and low in cost and may be utilized at many locations in inexpensive subsystems in and throughout a vehicle or building to control power and/or data distribution.

In achieving the above advantages and other advantages of the present invention, a single interface chip device for use in a time-division multiplex serial data bus system having a communications protocol is provided. The device includes first means for directly controlling information transfer between an I/O device and the data bus in at least one remote mode, and second means for control of information transfer between a processor and the data bus in a processor interface mode. The communications protocol includes a plurality of commands. The first means includes means for determining the validity of each of the commands and provides an echo response message to the data bus in response to each of the commands.

Also, preferably, three remote modes are provided including a remote switch mode, a data input mode and a data output mode.

The advantages according to the interface chip of the present invention are numerous. For example, the interface chip may be placed at intermediate locations in remote modules to control power and/or collect and distribute information to thereby eliminate the need to discretely wire remote locations directly to a centralized distribution center.

Also, the interface chip is capable of handling the communications protocol of the time-division multiplexed data bus system as well as provide an interface between the data bus and other electronic hardware elements.

The remote modules are controlled by messages from the multiplex data bus controller, which messages are formatted to the communications protocol by the interface chip.

The chip device of the present invention provides an interface from a bus controller microprocessor directly to various discrete input/output devices. The device does not require a microprocessor, memory, software, or any additional logic to interface with many input/output devices in its remote modes of operation.

The device's unique built-in Input/Output Controller not only coordinates the interface to a variety of microprocessors while operating in its processor interface mode (PIM), it also provides the logic that allows the device to interface with analog-to-digital converters, solid-state power controllers, relays, solenoids, switches, sensors, and other I/O devices.

The I/O controller automatically controls up to 32 input and/or output devices per remote node. The I/O Controller uses a 5-bit address bus, discrete control lines, internal memory, and a state machine to sequentially address and control the acquisition of 32 16-bit digital words. These words are stored in the device's internal memory and can be echoed back to the bus controller in the appropriate response.

The device can use the same 5-bit address bus, control lines and state machine to perform output functions of up to 32 16-bit digital words as requested by the bus controller over the serial data bus.

The main benefit of using a serial data bus is that the data to and from a multitude of locations, can be distributed, over a single wire instead of discrete wires, by a centralized computer. The vast majority of data that must be gathered and processed is simple sensor, switch or power control signals. These data sources and destinations can be found at various locations throughout a vehicle or building. Some of these locations do not have enough space for large electronic boxes. Therefore, only a small amount of electronics can be used to interface the data to the serial bus. Systems that require expensive microprocessors, software, and support logic cannot be used efficiently to acquire and distribute simple data.

The cost and complexity of integrating an existing serial data bus into a vehicle such as the U.S. Army's M1 A2 Tank is technically and financially prohibitive.

The device can be efficiently and cost effectively integrated into a variety of applications because no software or processing is required for the protocol communications (even in PIM) or remote mode operation. Complex communications systems containing several device nodes can operate with just one simple microprocessor or state-machine running the application software for the Bus Controller (PIM) node. The transparent communications protocol and integrated remote nodes allow the device to be used in systems by engineers who do not have experience with serial data communication theory. The low cost of implementing the device's bus network allows the benefits of command-/response serial communications to be applied to applications where other serial data methods are cost prohibitive. The device can be efficiently used in systems ranging from factory automation to military and space applications.

The features and advantages of the present invention are readily apparent from the following detailed description of the best mode for carrying out the invention when taken in connection with the following drawings.

BRIEF DESCRIPTION OF THE DRAWINGS

FIG. 9b is the second half of a flow chart of FIG. 8a;

BEST MODE FOR CARRYING OUT THE INVENTION

Figure 1:
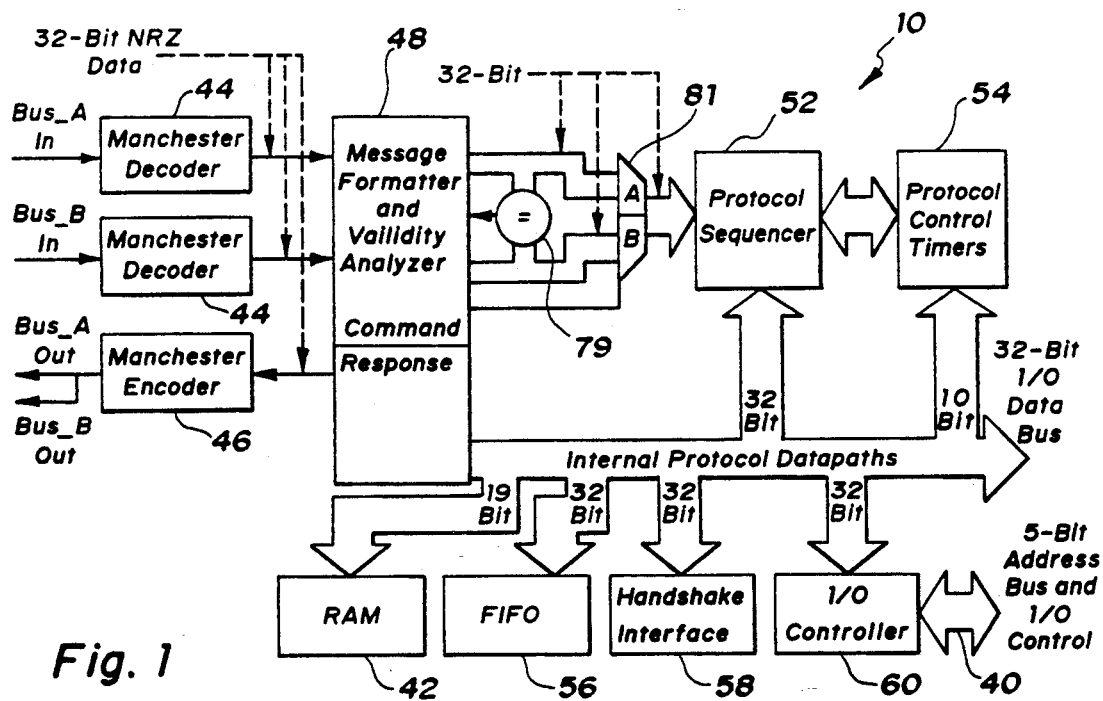
FIG. 1 is a generalized schematic block diagram of the interface chip device of the present invention.

Referring now to the drawing figures, there is illustrated in FIG. 1 a single interface chip device generally indicated at 10 for use in a time-division multiplex serial data bus system having a communications protocol. Such a system is illustrated in FIG. 8.

Figure 8:
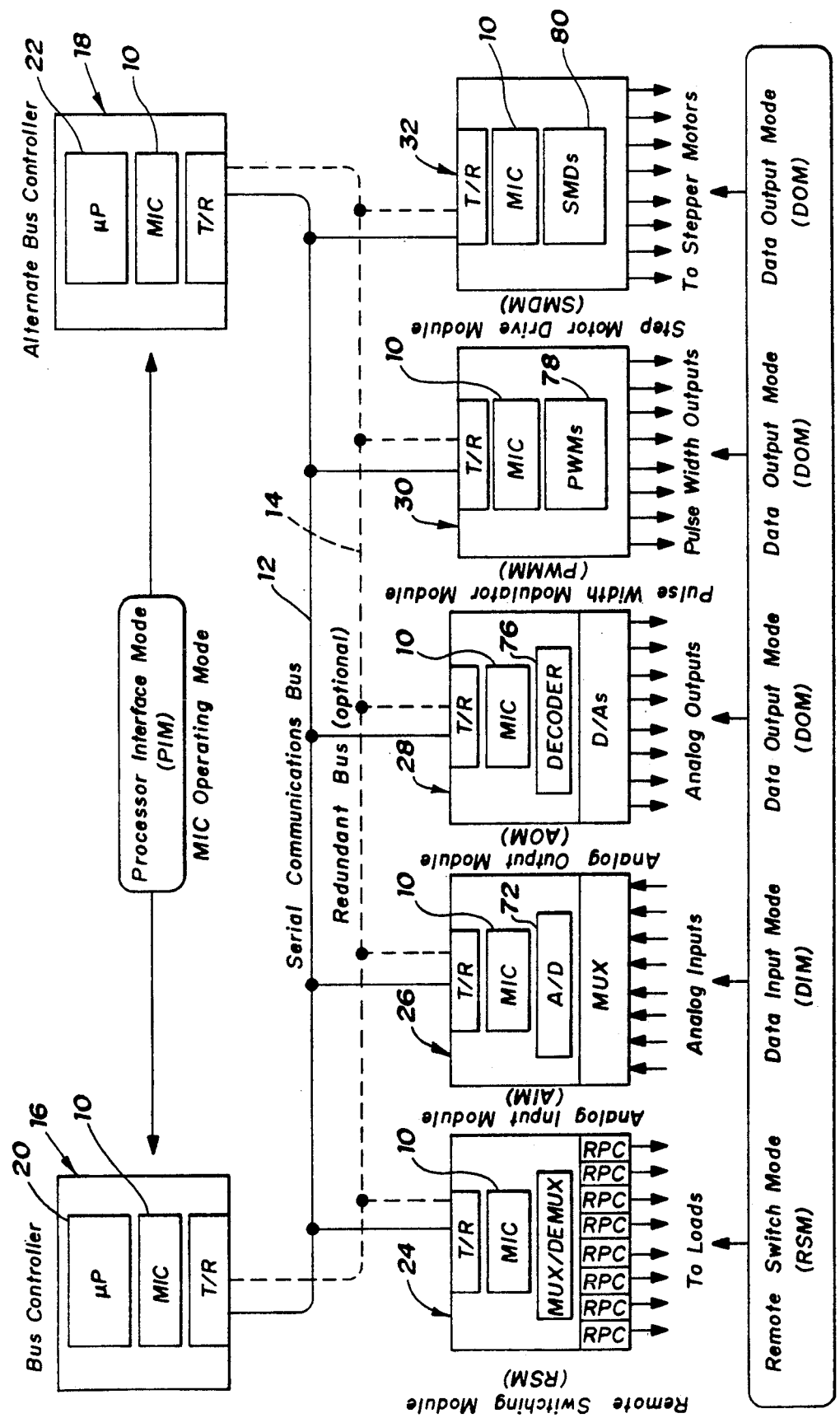
FIG. 8 is a schematic block diagram of a typical multiplex electrical power control and monitoring bus network wherein the interface chip device of the present invention is utilized in each of its operating modes.

As illustrated in FIG. 8, the device 10 comprises a MEPCAM (Multiplexed Electrical Power Control and Monitor) interface chip (MIC). The device 10 comprises a high performance integrated circuit (IC) which may be implemented as a high performance static 1.0 micron CMOS device. The device 10 is generally designed to handle the communications protocol of the time-division multiplex data bus system of FIG. 8 and provide an interface between a data bus 12 and/or an optional redundant data bus 14 and other electronic hardware elements. The bus rate is preferably 2.0 to 2.5 megabits per second.

The device may be utilized as a bus controller, generally indicated at 16, or an alternate bus controller, generally indicated at 18, when connected to a processor such as a 16 or 32 bit microprocessor 20 and 22, respectively.

When implemented in the bus controller 16 and/or the alternate bus controller 18, the device 10 controls the serial communications bus 12 and initiates all bus communications. The communications include both messages to and responses from remote modules such as: a remote switching module, generally indicated at 24; an analog input module, generally indicated at 26; an analog output module, generally indicated at 28; a pulse width modulator module, generally indicated 30; and a step motor drive module, generally indicated at 32. The device 10 also initiates all bus communications including both messages to and responses from the alternate bus controller 18. Furthermore, when the device 10 is in its processor interface mode, the device 10 handles all bus system timers, microprocessor interrupts and message response evaluation and control.

Typically, the modules 24–32 are located throughout an entire vehicle or building in convenient locations adjacent to the loads that the modules 24–32 are controlling or switching. As illustrated in FIG. 8, the remote modules 24–32 function as remote switching modules, data input devices and data output devices. A combination of the above modes is also possible. For example, the remote switching modules 24 may control up to 32 solid state power controllers and discrete signal input lines. Data from the remote modules 24-32 and obtained from various sensors, loads and switches may be periodically requested by the bus controller 16.

The remote modules 24–32 are controlled by messages from the multiplex data bus controller 16 which messages are formatted to the communications protocol of the data bus system.

Figure 3A:
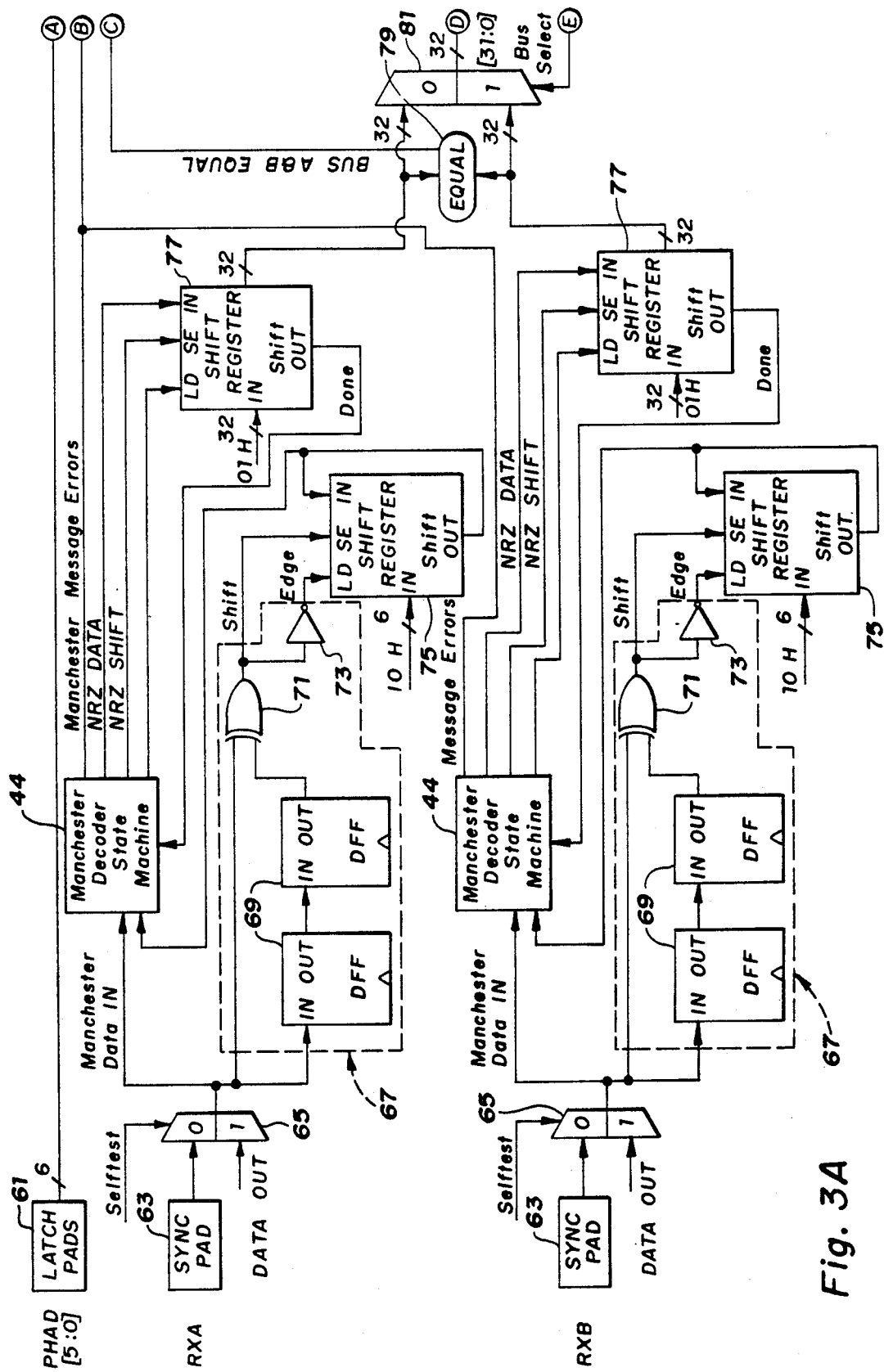
FIGS. 3a-3c is a detailed schematic block diagram of the interface chip device.
Figure 3B:
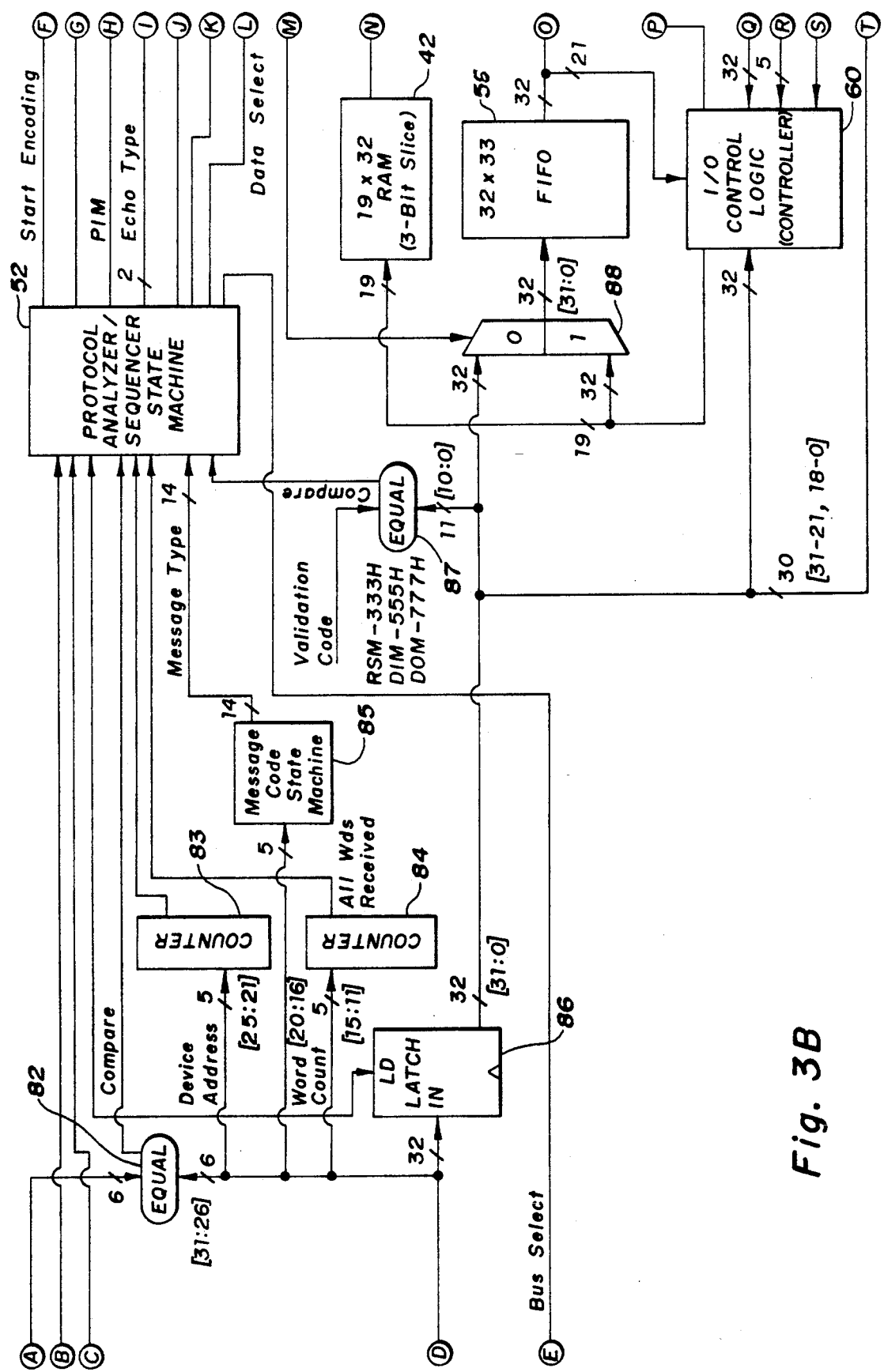
Figure 5:
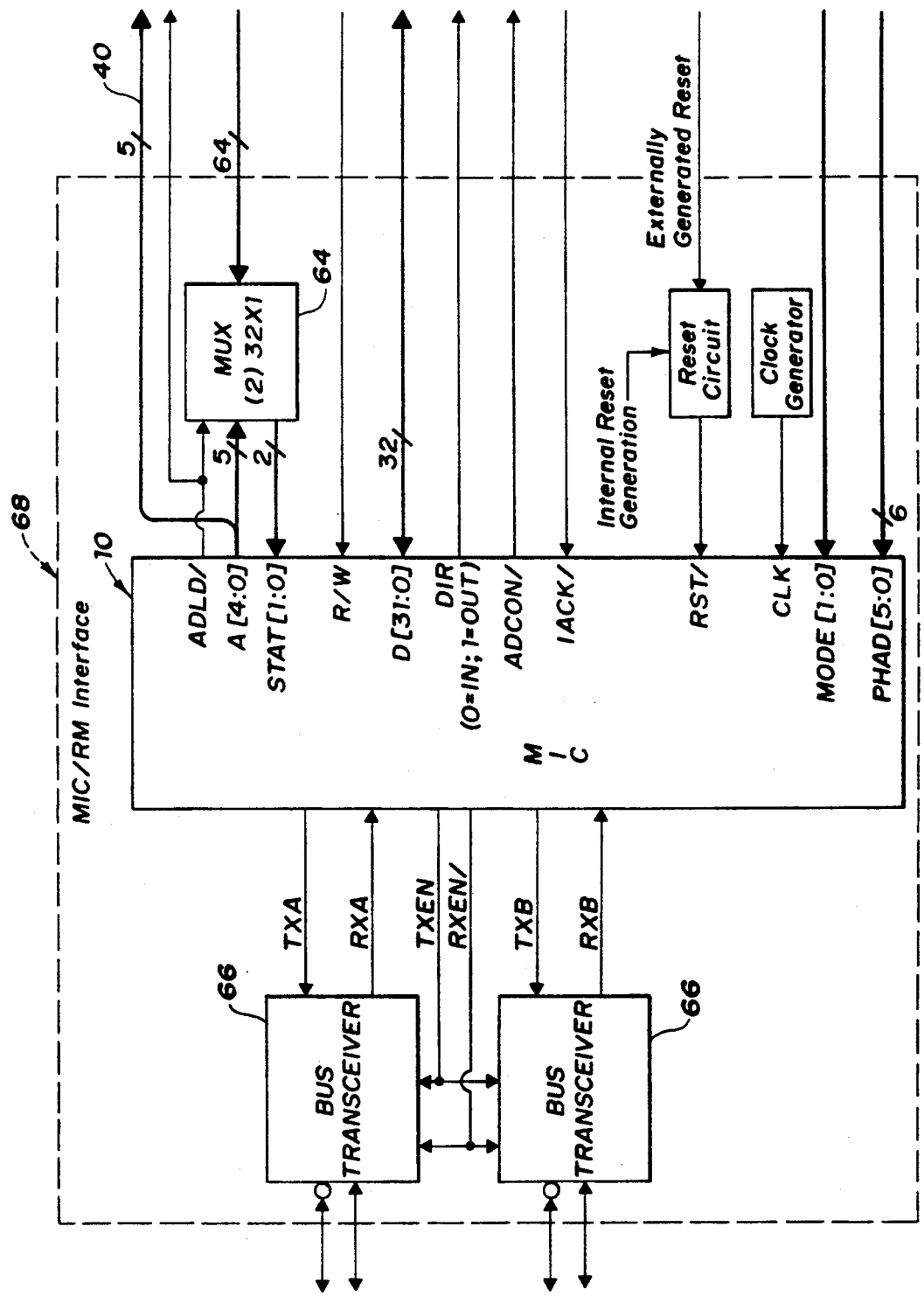
FIG. 5 is a schematic block diagram of the interface chip device connected in one of its three remote modes (i.e. MIM)

As illustrated in FIG. 5, when in the remote mode such as the remote switch mode, the 5-bit output address bus 40 is used to repetitively address 32 external 2-bit data locations which data is subsequently returned for storage in random access memory 42 of the device 10 as illustrated in FIGS. 1 and 3b. The data stored in the random access memory 42 can be transmitted to the bus controller 16 together with the appropriate echo response message as is described in greater detail below.

In the data input mode, the 5-bit address bus 40 is used to repetitively address up to thirty-two external 16-bit words of digital data, also for storage in the random access memory 42 of the device 10. This data can also be transmitted to the bus controller 16 in an appropriate echo response message. In this mode, the device 10 is capable of acquiring data from remote sensors when the device 10 is used in a module such as the analog input module 26.

In the data output mode, the device 10 is used to transfer data from the bus controller 16 to remotely located external logic in data blocks of up to 32 16-bit words per command. This mode allows the device 10 to be used in the implementation of output drive circuits and functions as illustrated by modules 28-32.

In addition to the random access memory 42, the device 10 includes Manchester decoders 44 to convert from Manchester bi-phase data to 32-bit NRZ data. Also, the device 10 includes a Manchester encoder 46 for encoding the 32-bit NRZ data to Manchester bi-phase data.

The device 10 also includes a message formatter and validity analyzer circuit 48 which analyzes and validates a protocol of the data bus system. The protocol consists of nine relatively simple 32-bit commands, eight of which are followed by a 32-bit verification or data response as described in detail hereinbelow. The circuit 48 analyzes and validates the protocol commands without the need for external memory or processing control. The circuitry 48 analyzes and validates the protocol commands before the requested function is performed and the appropriate response is sent to the bus controller 16 after encoding by the Manchester encoder 46.

The device 10 also includes a protocol sequencer 50 which sequences the 32-bit protocol commands under control of protocol control timers 54. Preferably, the protocol control timers 54 are programmable.

In addition to the random access memory 42, the device 10 also includes a first-in-first-out (FIFO) memory 56, a handshake interface 58 and an input/output controller 60. The input/output controller 60 controls the 5-bit address bus 40 as well as provides input/output control.

Figure 2:
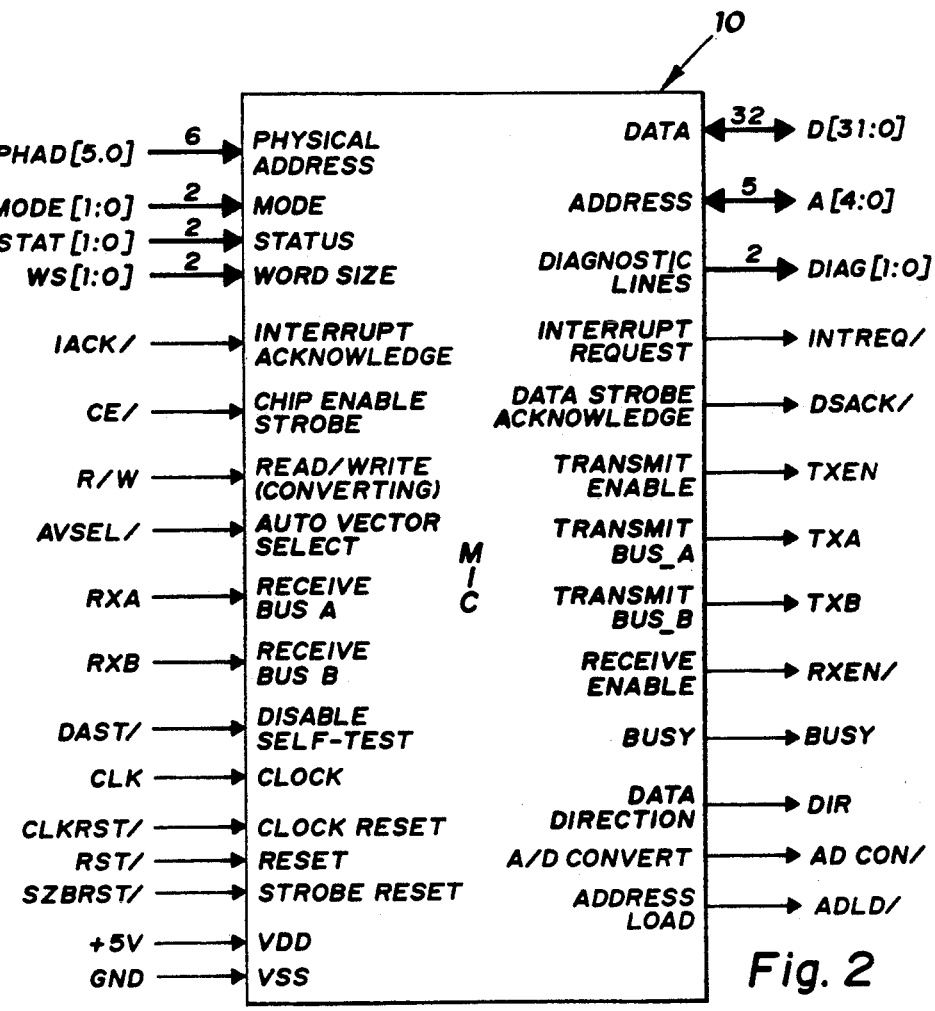
FIG. 2 is a schematic diagram of the interface chip device of the present invention with various input and output names illustrated thereon.

Referring now to FIG. 2, there is indicated the various input and output signals to and from the chip device 10 of the present invention. A detailed description of each of the signals is given in Table I as follows:

TABLE I

| Name | Description |
|---|---|
| RXA | Receive data on bus A |
| TXA | Transmit data on bus A |
| RXB | Receive data on bus B |
| TXB | Transmit data on bus B |
| TXEN | Transmit enable |
| RXEN | Receive Enable |
| MODE[1:0] | 2-Bit Mode Select: |
| MODE[1] | MODE[0] Description |
| 0 | 0 Processor Interface Mode (PIM) |
| 0 | 1 Remote Switch Mode (RSM) |
| 1 | 0 Data Input Mode (DIM) |
| 1 | 1 Data Output Mode (DOM) |
| CLK | System clock, up to 30 MHz 50% duty cycle |
| PHAD[5:0] | 6-bit hardwired physical address [Module ID] |
| A[4:0] | 5-bit bidirectional address bus |
| D[31:0] | 32-bit bidirectional data bus |
| DIR | Data direction: 0 = input, 1 = output or indicates a Peek Multiple Device response is in the Receive Buffer |
| WS[1:0] | Word size: |
| WS[1] | WS[0] LENGTH |

TABLE I-continued

| Name | Description |
|---|---|
| 0 | 0 Long Word |
| 0 | 1 Word |
| 1 | 0 Not Used |
| 1 | 1 Not Used |
| R/W | Read-write command: 0 = write, 1 = read A/D convert busy/ready signal (DIM) |
| DSACK/ | Data transfer and size acknowledge (active low) |
| BUSY | MIC is initializing, in PIM standby mode, (externally used to latch. D[15:0] in RSM/DIM combination mode) |
| INTREQ/ | Interrupt request (active low) [PIM] |
| IACK/ | Interrupt acknowledge (active low) [PIM], Output enable signal for next data word [DOM] |
| CE/ | Chip enable (active low) [PIM] |
| DIAG[1:0] | Diagnostic status: |
| DIAG[1] | DIAG[0] Status |
| 0 | 0 Self-test disabled |
| 0 | 1 Self-test failed |
| 1 | 0 Self-test passed |
| 1 | 1 Self-test in progress |
| ADLD/ | Address valid load pulse (active load) |
| ADCON/ | Analog to digital conversion command (active low) |
| STAT[1:0] | 32 2-bit status [loaded directly to RAM] |
| DAST/ | Disable self test (active low) |
| AVSEL/ | Auto vector select (active low) |
| RST/ | Reset, Reset logic, run self-test, initialize (active low) |
| SZBRST/ | Strobe Reset, Tie to RST/externally (active low) |
| CLKRST/ | System clock reset, Tie to Voo |

Figure 3C:
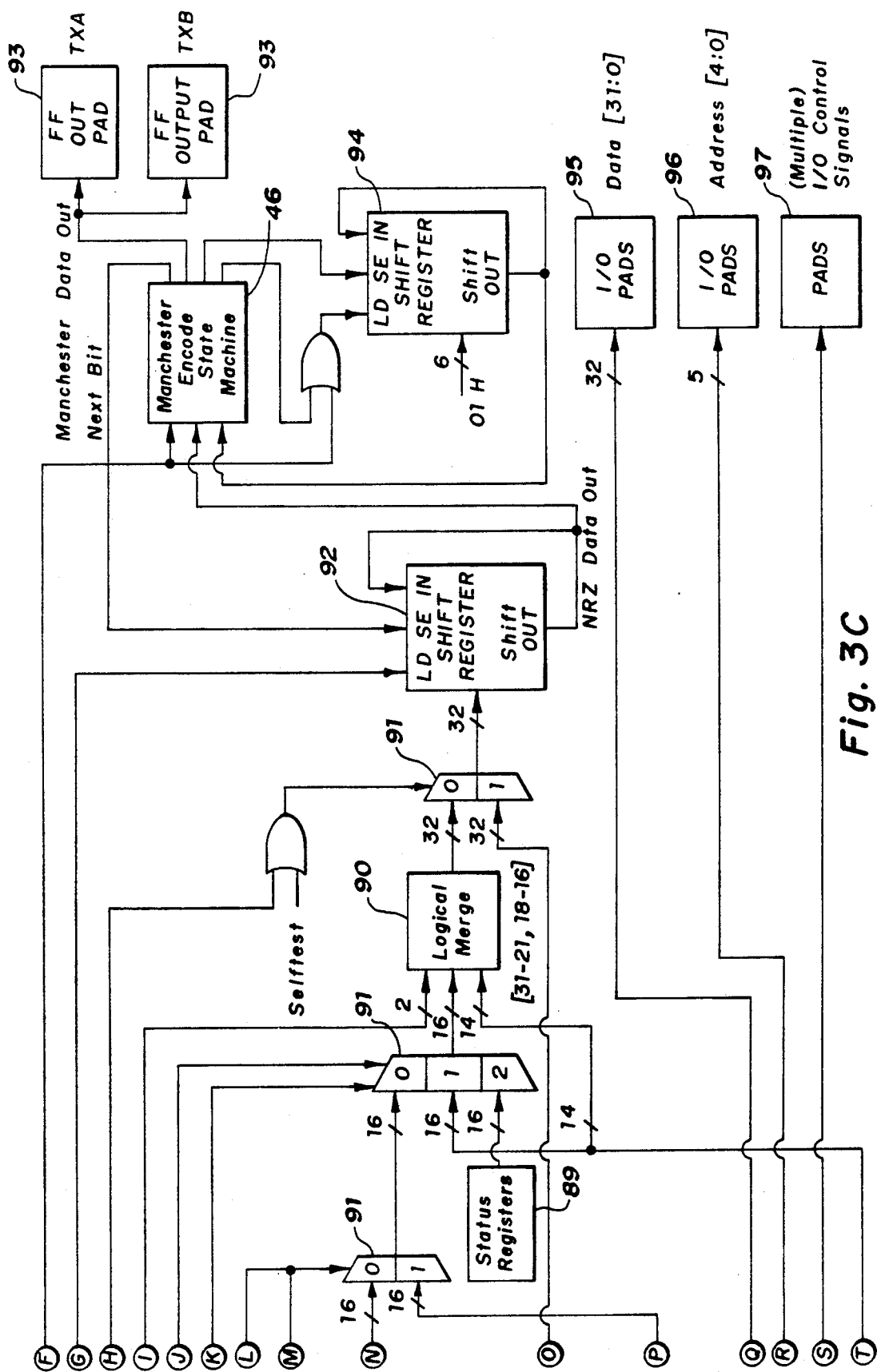
Figure 4:
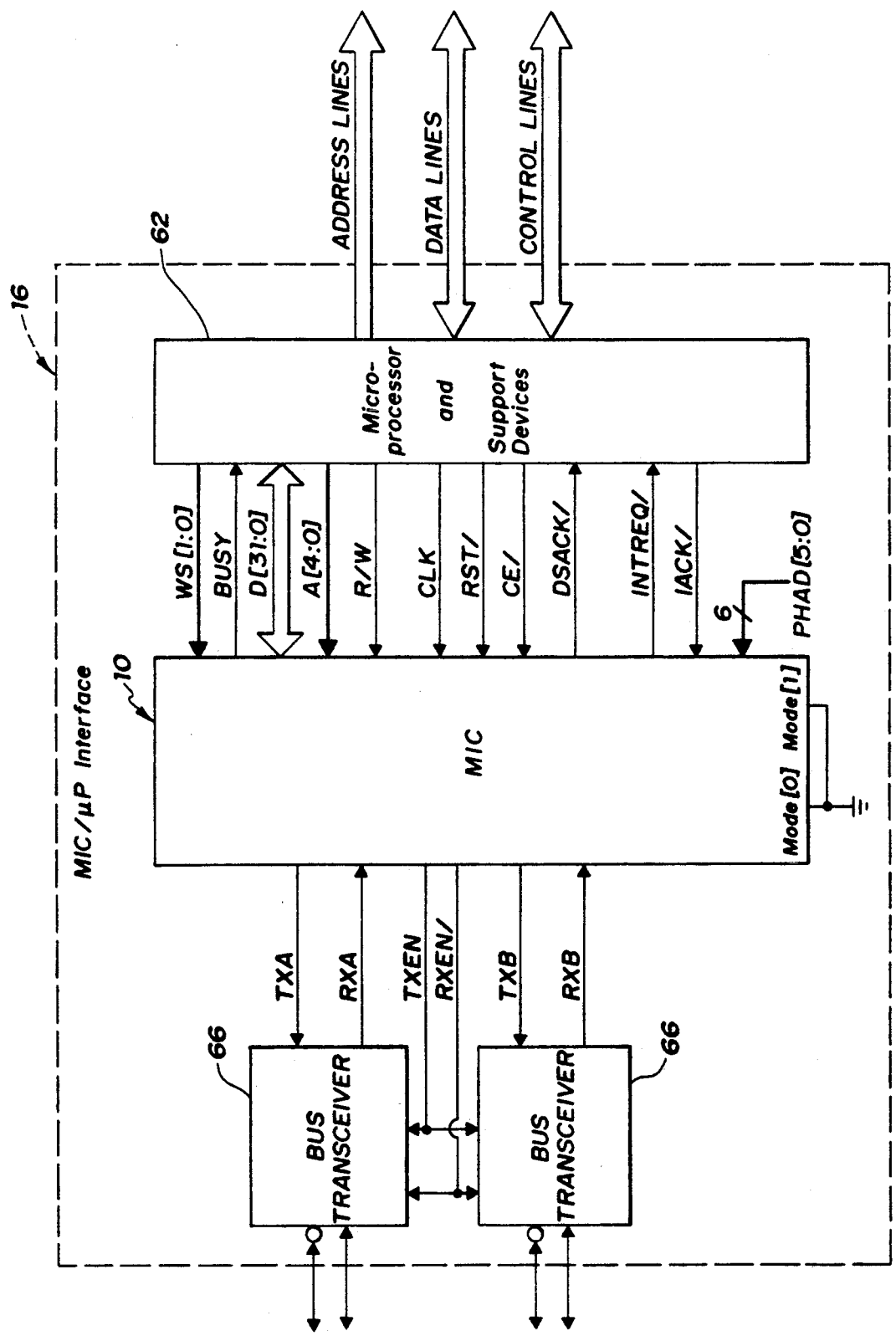
FIG. 4 is a schematic block diagram of the interface chip device connected in its processor interface mode.

Referring now to FIGS. 3a, 3b and 3c, there is indicated a detailed block diagram of the device 10

Block 61 indicates physical/module address pads. The device 10 has 6 external pins that are used to set a unique module address for its location on the MEPCAM Bus System.

Block 63 indicates serial data receive pads (RXA-RXB). The redundant serial data buses are brought into the device 10 through the synchronous pads 63. These pads 63 synchronize the incoming serial Manchester data to the device's internal clocks.

Block 65 indicates self test muxes. These multiplexers 65 are used to multiplex the device's encoding out data into the decoding circuitry. During self test, the device 10 transmits several serial Manchester encoded messages to itself. It then verifies that these messages were received as expected.

Block 67 indicates edge detection logic. Block 67 includes two flip flops 69, an exclusive or gate 71 and an invertor 73 which acts as a transition or edge detector. Since each Manchester databit must have a transition from 1 to 0 or 0 to 1, the device 10 can remain synced to the incoming data by resyncing the data sampling clock on every edge.

Block 75 represents a Manchester data sample clock generator or shift register. This six-bit shift register is used to generate a clock pulse which tells the Manchester decoder state machine 44 to evaluate and sample the incoming Manchester encoded data. Each Manchester data bit is 12 system clock cycles long. A data bit equaling a "1" will be high for six clocks then low for six clocks. A data bit equaling a "0" will be low for six clocks then high for six clocks. A Manchester sync pulse will be 18 clocks high then 18 clocks low. Therefore, the sample clock generator is setup to output a clock pulse 3 clocks after an edge/transition and 6 clocks during any non-transitioning data or sync pulse.

The Manchester decoder state machine 44 performs all of the incoming message decoding and conversion to non return-to-zero (NRZ) data. The machine 44 first monitors the data for a valid sync pulse then decodes the 32 bits of the message. It calculates and verifies that the parity bit makes the message contain an odd number of ones. This state machine 44 also generates all data error flags and control signals required to pass the correctly received message to the protocol interpretation sections of the chip device 10.

Block 77 represents serial to parallel converters or registers. This 32-bit shift register is used to convert the serial data bus message into a 32-bit parallel word that can be interrupted and used by the remaining logic of the chip 10.

Block 79 represents a bus A and bus B comparator. This 32-bit comparator is used to verify that the redundant buses both have sent and the decoders have received the identical data.

Block 81 represents a bus selection multiplexer. This mux is used to select which 32-bit parallel word is to be used by the remaining logic. If only one bus receives a good message, that bus is used. If good messages are received on both buses, bus A data is passed on.

Block 82 represents a module address comparator. This 6-bit comparator compares the externally hardware module address to the module address contained within the received message (Bits [31-26]). If the module ID compares, then the protocol analyzer/sequencer 52 is told that the received messages is intended for this device (or location on the bus network). If the module ID does not compare, the MIC 10 continues to decode bus messages until one is received with the correct module ID.

Block 83 represents a device address counter. The device address portion of the received message (bits [25-21]) are latched into this counter and will be used by the protocol analyzer/sequencer 52 if necessary.

Block 84 represents a word count counter. The word count portion of the received message (bits [15:11]) are latched into this counter and will be used, when appropriate, to verify the correct number of data words are received.

Block 85 represents a message code state machine. This state machine decodes the message type portion of the received message (bits [20:16]) and indicates to the protocol analyzer/sequencer 52 which one of the 14 types of messages has been received.

Block 86 represents a 32-bit latch. This latch holds the received message while the remaining logic performs the applicable function with its contents.

Block 87 represents a validation code comparator. This 11-bit comparator is used to compare a received validation code with the expected code for that mode in which the MIC 10 is configured.

As previously noted, block 52 represents the protocol analyzer/sequencer. This state machine monitors and sequences all protocol messages. It acts as the intelligence center and controller of most internal data. The protocol analyzer provides the step-by-step sequencing activities that are required to implement or act on the MEPCAM protocol.

A multiplexer 88 is used to select which 32-bit data bus is made available to the FIFO 56. When in the PIM mode, the FIFO 56 is used to store up to 33 32-bit messages which are written into the MIC 10 from the 32 external data pins. This data is then sent to the encoding logic 44 to be formatted and transmitted over the serial data bus. In the DOM mode of operation, the FIFO 56 is used to store the messages received from the serial bus before performing the requested output function.

The RAM 42 is preferably a 19-bit by 32 word RAM. The RAM 42 is used to store data from external signals which may be requested by other devices on the serial bus.

The I/O control logic or controller 60 controls all input and output functions of the address bus, data bus, and I/O control signals. This controller 60 automatically performs predefined I/O control functions continuously, depending on which mode the chip 10 is configured in. The I/O control function (inputting or outputting data, performing signal control for peripheral device, etc.) can be modified by messages received over the serial data bus when appropriate.

Block 89 represents a status register The status register consists of 16 bits of data which represent various internal and external conditions. The data contained in the status register can be made available to any PIM device on the bus.

Block 90 represents a logical merge and counter in combination with multiplexers 91. The logical merge block 90 and surrounding 3 multiplexers 91 are used, under control of the protocol analyzer/sequencer 52 to present the appropriate data to the logic that will encode and transmit messages on the serial data bus.

Block 92 represents a parallel to serial converter. This shift register is used to shift the parallel message, one bit at a time, to the Manchester encoder state machine 46 for processing. The serial output of the shift register is an NRZ representation of the message that will be transmitted.

The Manchester encoder state machine 46 adds a sync pulse and parity bit to the NRZ data presented to it by the parallel to serial shift register 92. The message is then encoded into a Manchester format. The encoder handles the transmission of all bus messages onto a redundant serial data bus at pads 93 (TXA, TXB).

Block 94 represents a Manchester data encoding clock generator. This 6-bit shift register is used to generate the clocking used by the Manchester encoder state machine 46 to transmit a waveform with the characteristics described with reference to block 75.

Block 95 represents I/O pads or bidirectional pads (32). When used as inputs, the data passes into the chip 10 statically. When used to output data, the data is latched to provide stable signals to external logic.

Block 96 represents bidirectional address pads (5).

Block 97 represents I/O control signal pads. The pads carry various signals used to interface the MIC 10 with external logic.

Communications Protocol

The protocol of the data bus system is made up of the nine basic commands. Eight of the nine commands require a response called an echo message. The nine commands are: Broadcast Command (No echo message); Execute Command; Peek Multiple Device Command—RSM/DIM (DIM data); Peek Single Device Command—RSM/DIM (DIM data); Peek Single Device Command; Peek Module Command; Peek Multiple Devices Command; Self-Test Command; and Set-Up Command. Each word consists of a sync, 32-bit data field, and a parity bit. The command word format is as follows:

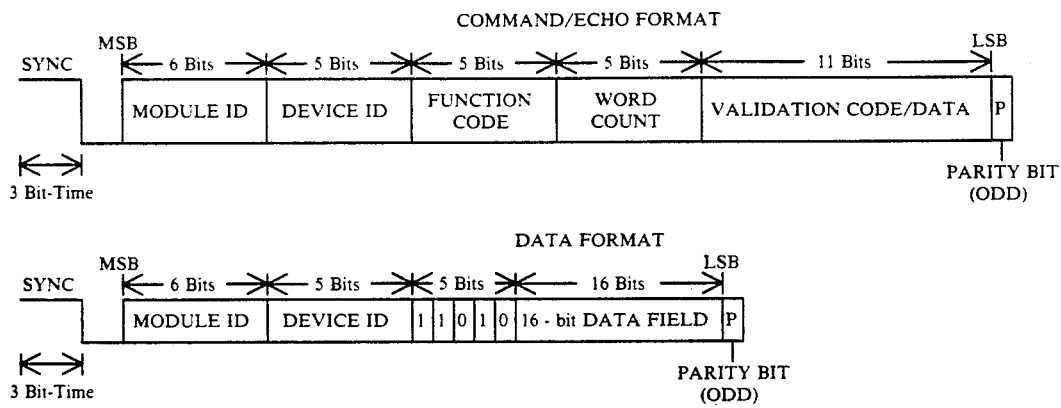

The sync waveform is an invalid Manchester signal with a width of three bit times. The sync waveform is high for the first one and one-half bit times and is low for the following one and one-half bit times. The device 10 recognizes sync waveforms from a normally held high or a normally held low serial input bus.

| Commands | |
|---|---|
| 00000 | Set-up Command |
| 00001 | Peek Multiple Devices Command |
| 00010 | Execute Command |
| 00011 | Peek Module Command |
| 00100 | Peek Single Device Command |
| 00101 | Run Self-test Command |
| 00110 | Peek Multiple Device Command-RSM/DIM (DIM data) |
| 00111 | Peek Single Device Command-RSM/DIM (DIM data) |
| Normal Echo | |
| 01000 | Set-up Normal Echo |
| 01001 | Peek Multiple Devices Normal Echo |
| 01010 | Execute Normal Echo |
| 01011 | Peek Module Normal Echo |
| 01100 | Peek Single Device Normal Echo |
| 01101 | Run Self-test Normal Echo |
| 01110 | Peek Multiple Devices Normal Echo - RSM/DIM (DIM data) |
| 01111 | Peek Single Device Normal Echo - RSM/DIM (DIM data) |
| Attention Echo | |
| 10000 | Reserved |
| 10001 | Peek Multiple Devices Attention Echo |
| 10010 | Execute Attention Echo |
| 10011 | Reserved |
| 10100 | Peek Single Device Attention Echo |
| 10101 | Run Self-test Attention Echo |
| 10110 | Peek Multiple Devices Attention Echo - RSM/DIM (DIM data) |
| 10111 | Peek Single Device Attention Echo - RSM/DIM (DIM data) |
| Broadcast/Data | |
| 11000 | Global Broadcast On |
| 11001 | Global Broadcast Off |
| 11010 | Data Word |
| 11011 | Module Broadcast On |
| 11100 | Reserved |
| 11101 | Module Broadcast Off |
| 11110 | Reserved |
| 11111 | I'm Alive message |

The Broadcast Command is a module/global command used to instruct one or all remote modules 24-32 in the Remote Switch Mode (RSM) to turn on or off all 32 devices assigned to that remote module. This command is valid for remote modules using the device's Remote Switch Mode or RSM/DIM combination mode only. Because this command may be received by more than one remote module, each remote module will suppress responding echoes.

The Execute Command is used to instruct a remote module to perform a specified task. It consists of a command word followed by 1 to 32 data words. The 5-bit Word Count field in the command word specifies the number of data words to follow. Every execute command word must have at least one data word following it. Once the execute command word is received, the module ID and validation code is checked.. If a match occurs, the data word(s) will be read and stored in the memory 42. The remote module then transmits back an Execute Normal Echo and carries out the requested task. If there is any problem with the validation code or word count, an Execute Attention Echo is sent and execution will not be performed. The command is valid for remote modules using the device's Remote Switch Mode (RSM), Data Output Mode (DOM), RSM/DIM combination mode, or DIM/DOM combination mode.

The Peek Single Device Command is used to request the status of data from specific devices assigned to one of the remote modules 24-32. The module address (ID) and device address (ID) is sent to a remote module in the Peek Single Device Command word. The device's status/data is returned in the Peek Single Device Normal Echo. If a validation code error is detected or the device status is not yet valid, a Peek Single Device Attention Echo will be returned. This command is valid for remote modules 24-32 using the MIC's Remote Switch Mode (RSM), Data Input Mode (DIM), or DIM/DOM combination mode.

The Peek Single Device Command—RSM/DIM (DIM data) is used to request data from a single device associated with one of the specified remote modules 24-32. This command is identical to the Peek Single Device Command except it is used in conjunction with remote modules 24-32 operating in RSM/DIM combination mode only. The data returned with this command is the data from the DIM operation of the device and not the status from the RSM operation of the device. The Peek Single Device Command may be used to request the status information from the RSM operation when a combination mode is used.

The Peek Multiple Device Command is used to request the status or data from multiple devices associated with the specified remote module. A Peek Multiple Device command has the option of requesting several device responses up to the entire contents of the remote modules status RAM 42 (i.e. 32 locations). This option may be beneficial if a close system analysis is performed on the data bus schedule, remote module device utilization and the bus controller processor requirements. The module address (ID) and number of devices to check is set in the Peek Multiple Device Command word. Each device status or data is returned in a Peek Multiple Device Normal Echo. The multiple echoes received by the bus controller 16 are placed in a receive buffer and a single interrupt to the processor is issued. If a validation code error is detected by the remote module or the device status is not yet valid, a Peek Multiple Device Attention Echo will be returned. This command is valid for remote modules using the MIC's Remote Switch Mode (RSM), Data Input Mode (DIM), or DIM/DOM combination Mode.

The Peek Multiple Device Command—RSM/DIM (DIM data) is used to request data from multiple devices associated with one of the specified remote modules 24–32. This command is identical to the Peek Multiple Device Command except it is used in conjunction with remote modules 24–32 operating in RSM/DIM combination mode only. The data returned with this command is the data from the DIM operation of the device and not the status from the RSM operation of the device. Peek Multiple Devices Command may be used to request the status information from the RMS operation when a combination mode is used.

The Peek Module Command is used to check a remote module's status. The requested module address (ID) is encoded in the Peek Module Command word. The internal 16-bit status Register 89 of the remote module is returned in the Peek Module Normal Echo. This command is valid for all remote modules (all MIC operational modes).

The Self-Test Command is used to instruct one of the remote modules 24–32 to run a self-test routine. Once this command is received, the module ID and validation code is checked. If a match occurs, the device 10 transmits back a Self-Test Normal Echo and starts self-test. If there is any problem with the validation code or transmission, a Self-Test Attention Echo is sent and the self-test will not be performed. This command is valid for all remote modules (all MIC operational modes).

The Set-Up Command is used to transfer initial system Set-Up data from the bus controller 16 to any remote module. Once a remote module recognizes its module ID and checks the validity of the command, it processes the command, loads the Set-Up data and responds to the bus controller 16 with a Set-Up Normal Echo. This command is valid for all remote modules (all MIC operation modes).

CHIP DEVICE OPERATION

Power-Up/Reset

Upon power-up or when the RST/ signal is asserted low, all processing stops. The BUSY signal is set high, and the chip starts its internal initialization. The device checks its DAST/ pin for a signal. If the signal is low, the device resets its outputs, indicates that self-test is disabled on the diagnostic pins DIAG[1:0] and continues normal operation after RST/ is asserted high. If the DAST/ signal is high, the device will being its self-test routine after RST/ is asserted high. The reset timing requires that CLKRST/, SZBRST/, and RST/ are low at the beginning of a reset request. The CLKRST/ signal should be low for a minimum of four clock cycles after the power is turned on (internal clock logic is reset). An asserted low signal on the CLKRST/is required only during the initial power up sequence and not for a chip reset. After the CLKRST/ signal returns high, RST/ and SZBRST/ should remain low an additional 24 clocks minimum. The CLKRST/ signal does not have to be used except when synchronizing the MIC to VLSI test equipment. The CLKRST/ signal can be tied high for normal operations. The internal self-test exercise and checks the internal RAM 42, FIFO 56, message control and encoding/decoding loopback functions. The self-test takes approximately 10,000 clocks to execute. The self-test runs until all conditions are tested or the test time-out has been reached. If a failure occurs, the diagnostic pins DIAG[1:0] will reflect it. Upon completion of the self-test, the chip's status is shown on the diagnostic pins as follows:

| DIAG[1] | DIAG[0] | RESULT |
|---------|---------|--------|
| 0 | 0 | Self-test disabled |
| 0 | 1 | Self-test failed (device is bad) |
| 1 | 0 | Self-test passed (device is good) |
| 1 | 1 | Self-test in progress |

After testing, the device 10 reads its 6-bit hardwired module ID (PHAD[5:0]) and mode select bits (MODE[1:0]), stores them in memory 42 for future access, and initializes itself. The BUSY signal is returned low upon completion of initialization except, if in the PIM, this signal also indicates that the PIM is in the standby or alternate bus controller mode. The initialization routine includes clearing all internal latches, registers and previously loaded set-up parameters. This reset process is repeated any time a RST/ signal occurs or a Soft Reset is requested in the Processor Interface Mode.

Mode Selection

The base modes of operation is selected by setting the mode select pins as indicated below.

| MODE[1] | MODE[0] | MODE |
|---------|---------|------|
| 0 | 0 | Processor Interface Mode (PIM) |
| 0 | 1 | Remote Switch Mode (RSM) |
| 1 | 0 | Data Input Mode (DIM) |
| 1 | 1 | Data Output Mode (DOM) |

The mode select pins are read and stored in memory 42 during initialization as described above. Two other modes of operation are also available. They are combination modes using fundamentals from the base modes. Both of these modes are targeted for remote modules only.

RSM/DIM Combination Mode—This mode is selected a Set-up Command with bit 15 set to a remote module that is configured for RSM mode (MODE pins are hardwired for RSM mode).

DIM/DOM Combination Mode—This mode is automatically enabled in a remote module that is configured for DOM mode (MODE pins are hardwired for DOM mode). Validation codes are used in the command word to further verify proper operation of the system. The validation codes are fixed values defined for each mode (except PIM) and are transmitted in all command words that request a remote module to alter its outputs. The codes are listed below.

| Validation Code | Mode |
|---|---|
| 333h | Remote Switch Mode (RSM) |
| 555h | Data Input Mode (DIM) |
| 777h | Data output Mode (DOM) |

Validation codes are also valid when the target remote module is in a combination mode. The validation code selection reflects the base mode of operation for the specific command to be transmitted. For example, if an execute command is issued to a remote module in RSM/DIM combination mode, the validation code reflects an RSM mode type since that is the mode of operation for which the execute command is intended.

MODES OF OPERATION

The following provide details of the operation of each of the four base MIC modes of operation and the two combination modes of operation.

Processor Interface Mode (i.e. PIM) Operation

Figure 9A:
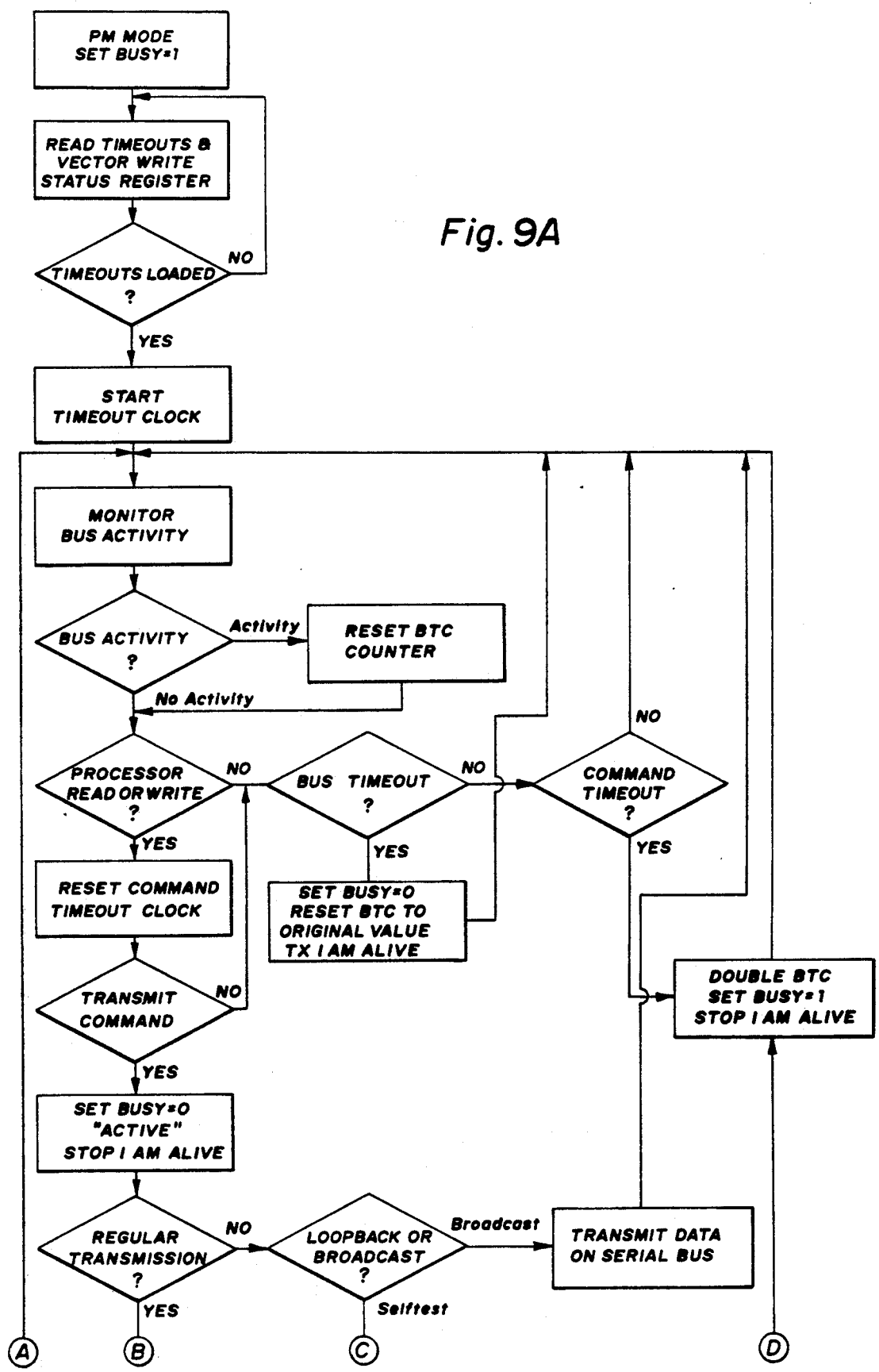
FIG. 9a is the first half of a flow chart illustrating the operation of the interface chip device in its processor interface mode.
Figure 9B:
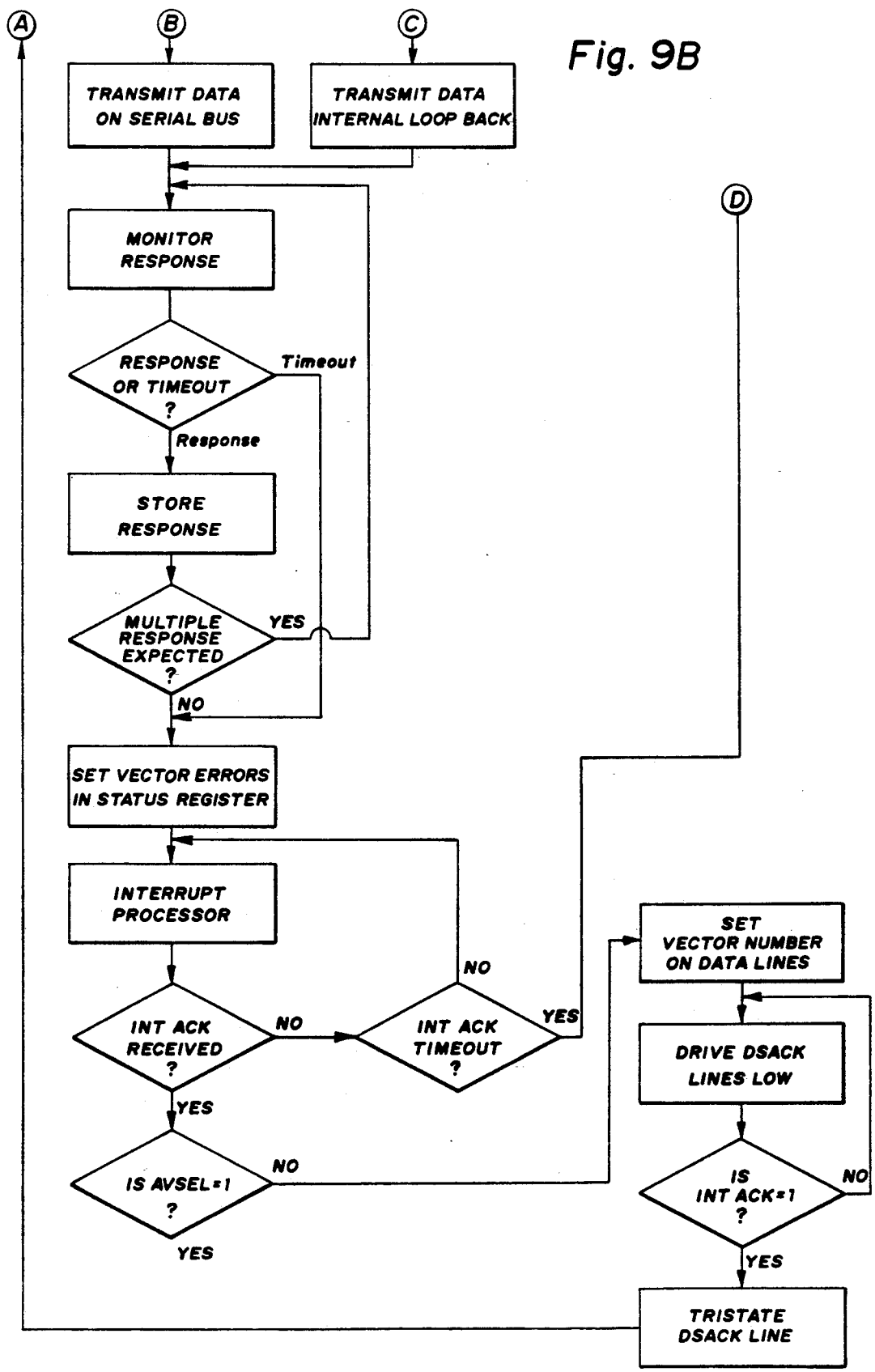

In this mode, the MIC 10 is used to interface the serial data bus to a microprocessor and its assigned support lines 62 via data, address, and control lines as illustrated in FIG. 3. The MIC 10 is capable of excepting long word (32-bit) or word (16-bit) write and read data transfers to and from the microprocessor. FIGS. 9a and 9b show a detailed flowchart of PIM operation.

MIC Control And Status Resisters Addressing

The MIC 10 contains nine control and Status Registers when operating in the PIM. The MIC 10 address location for each register is shown in Table II herein below. The processor used must be capable of accessing the MIC's registers using long word (32-bit) or word (16-bit) reads and writes. The size pins WS[1:0] inform the MIC 10 of the length of the desired data transfer cycle. WS[1:0] is held to 10 during a word transfer cycle. The MIC 10 is always capable of long word transfers to or from the selected processor or interface logic. If a word transfer format is selected, two sequential word transfers are required to complete a read or write to a MIC register that is longer than 16 bits. The first word transfer uses the target register's base address with the second word transfer using the register's base address plus one. For example, if the processor is writing to the MIC's Transmit Buffer using word transfers, it first writes the most significant 16 bits of data to address 01110 then the least significant 16 bits of data to address 01111.

TABLE II

| MIC Address | | |
|---|---|---|
| A[4:0] | Reg. Type | Size |
| 00000 | Write Only | 10-bit |
| 00010 | Write Only | 10-bit |
| 00100 | Write Only | 10-bit |
| 00110 | Write Only | 10-bit |
| 01000 | Write Only | 19-bit |
| 01010 | Read Only | 16-bit |
| 01100 | Write Only | 8-bit |
| 01110 | Write Only | 32-bit |
| 10000 | Read Only | 32-bit |
| Active I/O Lines | Register Description | |
| D[9:0] | Bus Time-out Constant* | |
| D[9:0] | No Command Time-out Constant* | |
| D[9:0] | No Response Time-out Constant* | |
| D[9:0] | Interrupt Ack. Time-out Constant* | |

TABLE II-continued

| MIC Address | |
|---|---|
| D[18:0] | Set-up Register |
| D[15:0] | Status Register |
| D[7:0] | Base Vector Number |
| D[31:0] | Transmit Buffer |
| D[31:0] | Receive Buffer |

*Time = ([binary to decimal conversion of 10 bit field] × 240) / (system clock)
Note: 1 × Master BTC < Alternate BTC < 2 × Master BTC Time-out Constant Registers. The MIC 10 contains four 10-bit time-out constant registers (not shown) that must be initialized by the processor with non-zero values before the registers are activated. Each register is decremented, when appropriate, one bit for every 240 external clocks.

Bus Time-out Constant Register (BTC). The MIC 10 begins to decrement a BTC register (not shown) after all time-out constant registers have been initialized. The BTC register re-initializes to the originally loaded value when a valid sync has been detected or when the MIC 10 is transmitting on the serial data bus. The BTC register decrements to zero (times-out), the BUSY signal and bit 1 of the Status Register are set low indicating that the PIM is the bus master. Also, after the BTC register times-out the MIC 10 will begin to repetitively transit an "I'm Alive" message over the serial data bus until a request is made by the processor to stop or to transmit a bus command. A BTC register time-out also clears the data in the Receive Buffer.

No Command Time-out Constant Register (NCTC). The MIC 10 will decrement a NCTC register (not shown) after all time-out constant registers have been initialized. The NCTC register re-initializes to the originally loaded value when a valid read or write transfer is performed by the processor or the register times-out. If this register times out, it will cause the BUSY signal and bit 1 of the Status Register to be set to a high indicating that the bus controller 16 is now in an alternate bus controller mode. An NCTC register time-out will also cause the original BTC register value to be doubled.

No Response Time-Out Constant Register (NRTC). The MIC 10 will decrement a NRTC register (not shown) after the last bit of the last serial command has been transmitted. The NRTC register will re-initialize to the original load value after the MIC 10 receives a complete response message or upon timing out. A no response interrupt to the processor will be generated by the MIC 10 when time-out occurs. The interrupt type will be set in the Status Register in 89 on bits 11,10.

Interrupt Acknowledge Time-Out Constant Register (IATC). An IATC register (not shown) will begin to decrement after the MIC 10 generates an interrupt to the processor. The IATC register will re-initialize to the originally loaded value after the processor acknowledges the interrupt request or when the IATC register has time out. If this register times out it will cause the BUSY signal and bit 1 of the Status Register to be set to a high indicating that the bus controller 16 is now in an alternate bus controller mode. An IATC register time-out will also cause the original BTC register value to be doubled.

Set-up Register. The MIC contains an 11-bit Set-up Register (not shown) that provides the processor with a means to be set-up and initiate communications or diagnostics. Bits 0–4, 6, and 7 in the Set-Up Register are automatically reset after their function is performed. Bits 5, 8, 9, and 10 only change when written to or a reset occurs. The Set-Up Register bit fields and descriptions are shown in Table III.

TABLE III

| Register Bit | Description |
|---|---|
| 10 | Disable time-outs |
| 9 | Interrupt on Module ID only (Alternate Bus Controller) |
| 8 | Interrupt on Echoes only (Alternate Bus Controller) |
| 7 | Peek Multiple Devices (multiple echoes expected) |
| 6 | Clear Transmit Buffer |
| 5 | Monitor Mode (disable "I'm Alive" message) |
| 4 | Broadcast Transmit (no echo expected) |
| 3 | Soft Reset |
| 2 | Disable Transmission on Bus B |
| 1 | Disable Transmission on Bus A |
| 0 | Transmit Data From Transmit Buffer |

Monitor Mode. The MIC 10 has the ability to enter a monitor mode in which it monitors the serial bus 12 and places all valid messages in its Receive Buffer. All messages, including the "I'm Alive" message and Bad Echoes, are: (1) received and placed in the Receive Buffer; (2) interrupt request (INTREQ/) is asserted low; and (3) the microprocessor may request the data via the Receive Buffer. Setting bit 5 in the Set-up Register enables the monitor mode feature. Since the Set-up Register is only accessible in Processor Interface Mode, the Monitor mode is available only to MIC's hardwired for the PIM base mode. In this mode, the MIC disables its own ability to generate an "I'm Alive" signal on the serial bus.

Status Register 89. The internal 16-bit Status Register 89 can be accessed by the processor. This register contains the status of the various events as shown in Table IV.

TABLE IV

| Register Bit | Name | Description |
|---|---|---|
| 15 | MODE[1] | Mode select bit |
| 14 | MODE[0] | Mode select bit |
| 13 | DIAG[1] | Diagnostic result |
| 12 | DIAG[0] | Diagnostic result |
| 11 | VECTOR[1] | Interrupt type |
| 10 | VECTOR[0] | Interrupt type |
| 9 | BAD_PAR_A | Parity error on bus A |
| 8 | BAD_PAR_B | Parity error on bus B |
| 7 | BAD_MAN_A | Invalid Manchester data on bus A |
| 6 | BAD_MAN_B | Invalid Manchester data on bus B |
| 5 | WORD#ERROR | Data word count error |
| 4 | VAL CODE ERROR | Validation code error |
| 3 | BLOCK ERROR | Serial bus A did not match bus B |
| 2 | PEEK BUSY | Loads are not yet stable |
| 1 | STANDBY | Standby to be bus master |
| 0 | TIMER STARTED | Time-out registers have been initialized |

Base Interrupt Vector Number Register. An 8-bit interrupt vector number register is provide for processors with the capability of utilizing vector number interrupt processing. This value will be loaded into the register by the processor 20 during PIM initialization. The least significant 2 bits of this number may be modified before the vector number is placed on the least significant byte of the data bus during an interrupt cycle. The four types of MIC interrupt numbers are shown in Table V. Because the MIC 10 has four interrupt vector numbers, the maximum value of the base vector loaded in the register is 11111100 (Fc Hex). This interrupt method can be disabled, by setting AVSEL/ high, for processors that cannot take advantage of vector number interrupt processing or systems where autovectoring is preferred.

TABLE V

| VECTOR[1] | VECTOR[0] | Interrupt Type |
|---|---|---|
| 0 | 0 | Normal Echo received |
| 0 | 1 | Attention echo received |
| 1 | 0 | No echo received |
| 1 | 1 | Bad echo received |

Transmit Buffer. The 32-bit wide by 33 word deep write only FIFO 56 is provided internal to the MIC 10 to buffer the bus commands that will be sent on the serial data bus of the MIC 10. When requested through the Set-up Register, the data located in this buffer 56 will be transmitted on a first data-word-in, first data-word-out order. Each data word will be formatted into a 36-bit Manchester messages and transmitted over the serial data bus. The Transmit Buffer may be cleared by setting bit 6 in the Set-up Register.

Receive Buffer. The 32-bit wide by 33 word deep write only FIFO 56 provided for the Transmit Buffer is shared by the Receive Buffer. The Receive Buffer works on a first data-word-in, first data-word-out order. The single echo response from a remote module is stored in a latch while multiple echo responses are stored in the FIFO 56. The information is available to the microprocessor via register 10h and the latch, FIFO arbitration is transparent to the system.

Time-out Register Loading Sequence. The time-out constant registers are loaded any time after the power-up/reset sequence has been completed. The start Time-outs bit (Status Register bit-0) is set high upon completion of the time-out constant loading sequence. The Base Vector Address register for the interrupt types is loaded at this time also.

Manchester Encoded Bus Monitor Sequence. The MIC 10 continuously monitors the serial data input buses for valid Manchester encoded messages until requested to transmit. The MIC 10 will also accept valid read and write commands from the microprocessor. The No Command Time-out Constant register is re-initialized after receiving any valid processor's read or write.

BTC Register Time-out Sequence. If no bus activity is detected and the BTC register times-out, the following sequence of operations occur: (1) Status Register Standby Bit [1] and the external BUSY signal are asserted low to indicate that the MIC 10 is in bus master mode; (2) The original BTC value is reloaded into the BTC register; and (3) The MIC 10 begins to repetitively transmit "I'm Alive" messages consisting of a sync pulse, 32 Manchester encoded "1's" and a parity bit indicating odd parity.

No command Time-out Sequence. The MIC 10 performs the following sequence of operation when the NCTC register times-out: (1) Status Register Standby Bit [1] and the external BUSY signal are set high to indicate that the MIC 10 is in the bus alternate mode; (2) The original BTC value is doubled and reloaded into the BTC register. This will allow the alternate bus controller 18 to take control of the bus 12; (3) The "I'm Alive" message is immediately terminated if active; and (4) The MIC 10 will then begin the Bus Monitoring Sequence.

Receive Cycle Overview. The Bus Controller 16 receives serial Manchester encoded data from one of the Remote Modules 24-32 via the RXA and RXB pins simultaneously. The MIC 10 checks the data, selects a good message, and stores it in its RX BUFFER (10H). The MIC 10 asserts the INTREQ/ signal low to interrupt the μP 20 to respond with an interrupt acknowledge.

After receipt of an interrupt acknowledge from the μP 20 (μP 20 asserts IACK/ low), the MIC 10 places the Auto Vector Level (Base Vector Address+Interrupt type) on D0-D7 and activates the DSACK/ lines. The echo interrupt types are Normal echo=0, Attention echo=1, No echo=2, and Bad echo=3.

If the μP 20 fails to respond to an interrupt, an Interrupt Acknowledge Time-out will occur (programmable via address 06H). The MIC 10 responds by deactivating its INTREQ/, doubles its BTC automatically, and goes back to monitoring bus activity. This allows the alternate Bus Controller 12 to take over. This completes the Bus Controller Receive Cycle. The MIC 10 then goes back and waits for a command from the μP 20. Any errors in the receive cycle causes the MIC 10 to set special flags in the Status Register.

For systems where autovectoring is preferred, a second interrupt mode is available. In this mode, the interrupt level is stored in the MIC Status Register. After the μP 20 is interrupted, it may find the location of the interrupt level in the MIC's Status Register (0AH); bits 10 and 11. The interrupt level is not placed on the data bus. The AVSEL/ pin must be deasserted (high) to utilize this mode.

Receive Sequence. The MIC 10 may receive and decode messages from both buses 12 and 14 by performing the following sequence. The MIC 10 is in receive mode until the microprocessor 20 sets bit (0) of the Set-up Register. (1) Monitor both buses 12 and 14 for valid sync signal; (2) Decode next 32 data bits and the parity bit; (3) Calculate parity for the 32 bit data; (4) Compare calculated parity with received parity bit (parity check); (5) If messages have been received on both buses 12 and 14, compare both 32-bit data words to check if they are identical; (a) If both are identical, select one to be placed in the receive buffer and reset the block compare error bit; (b) If the data words are different but the parity check passed: Set block compare error bit high (bit 3 of Status Register) and enter interrupt sequence; (c) If the parity check passes on one bus but not on the other: Select the data word with the correct parity and place it in the receiver buffer; set corresponding parity error bit (bit 8 or 9 status register); and enter interrupt sequence; (d) If both data words are different and both fail parity check: set bits 8 and 9 high and return to start of receive sequence; (6) If no message has been received from the other bus within 6 clocks (375 ns @16 MHz): (a) If parity check has been passed: place the data into the Receive Buffer and enter interrupt sequence; (b) If parity check failed: set corresponding parity error bit (bit 8 or 9 of status register); and (7) If Manchester error has been detected in received message: Set corresponding Manchester error bit (bits 6 or 7 of status register); If other message is valid, place the data into the receive buffer and enter interrupt sequence; and If other message received is invalid, set corresponding status register bit. Return to receive sequence.

Transmit Cycle Overview. The transmit command and data words follow the MIC command/echo and data formats as previously described. To transmit a message, the μP 20 writes a maximum of 33 data words (one command word and up to 32 data words) into the MIC's Transmit Buffer and then writes a configuration to the Set-up Register. Setting Bit 0 shifts and encodes the data out on the TXA and/or TSB pins. Resetting Bit 0 disables the transmission of data on either bus. Setting Bit 1 disables transmit on bus A. Resetting Bit 1 enables transmit on bus A. Setting Bit 2 disables transmit on bus B. Resetting Bit 2 enables transmit on bus B.

Upon receipt of the command and data, the MIC 10 issues a data acknowledge (DSACK/) to the μP 20, resets Set-up Register Bits 0-2, and proceeds to its transmit routine. In normal operation, the μP 20 does not write to the MIC 10 again until it receives an interrupt.

A Remote Module shall respond to a valid command word within 36 to 96 clocks. If an execute command is used, there shall be not gap between the command word and the following data words.

If a Remote Module does not receive the proper number of data words or a message gap greater than 36 clocks, it will respond with an attention echo. The attention echo will be issued between 36 clocks minimum, 192 clocks maximum after the error is detected.

The minimum No Response Time-out is 240 clocks. This is the minimum amount of time the Bus Controller 11 will wait before it considers that a no response is valid. If any MIC (any mode) transmits on the serial bus 12 for a time greater than 16,000 clocks, the CHATTER TIMER will automatically deassert the transmit enable signal (TXEN) by the hardware inside the MIC. This transmit enable signal is permanently disabled until a reset (hard or soft) is issued.

Transmit Command Sequence. The MIC 10 may perform one of three transmit command sequences when the microprocessor 20 has written to the Transmit Buffer. The transmit command is valid after completion of the powerup/reset and time-out register loading sequences. The 3 types of transmit commands are broadcast, regular and loopback.

Broadcast Sequence. The MIC 10 will begin transmitting the broadcast message on the serial bus 9 clocks (562.5 ns @16 MHz) after the microprocessor writes the bit pattern 10xx1 to Set-up Register bits 4 through 0 and DSACK/ is asserted. Set-up Register bits 1 and 2 are used to disable bus(es) A and/or B when set. The broadcast sequence is as follows: (1) Fetch message from Transmit Buffer; (2) Add sync and parity to format message; (3) Manchester encode and transmit message; and (4) Start/continue bus monitor sequence.

Regular Sequence. The MIC 10 will begin transmitting a message on the serial bus 9 clocks (562.5 ns @MHz) after the microprocessor 20 writes the bit pattern 00xx1 to Set-up Register bits 4 through 0 and DSACK/ is asserted. Set-up Register bits 1 and 2 are used to disable bus(es) A and/or B when set. The regular sequence is as follows: (1) Fetch message from Transmit Buffer; (2) Add sync and parity to format message; (3) Manchester encode and transmit message; (4) Continue sequence 1 through 3 until buffer is empty. The intermessage gap time shall be zero; (5) Start decrementing the no response time-out register; (6) Monitor bus until either a valid message(s) is received or a NRTC time-out occurs; (a) If a valid message(s) is received, return to start of receive sequence. Multiple messages will be received if the transmit command was a Peek Multiple; and (b) If a NRTC time-out occurs, enter interrupt sequence.

Loopback Sequence. During this special transmit cycle, the microprocessor 20 may write one data word to the Transmit Buffer. The data word must contain a valid function code. This data will not be transmitted on the serial bus if bits 0-2 are set in the Set-up Register. However, this condition allows the MIC to receive its own message (RXA=TXA; RXB=TXB). The receive message is saved in Receive Buffer and no message is output to the serial bus. This diagnostic feature checks the chip's internal circuitry and logic (sync generation/detection, Manchester encoder/decoder, parallel to serial, serial to parallel). After the message is in the Receive Buffer, the MIC 10 interrupts the μP 20 so it can read the buffer and check the data for integrity. The flow of the local loopback is as follows: (1) The one message contained in the Transmit Buffer is Manchester encoded; (2) Add sync and parity to format message; (3) The MIC then transmits the data word to itself. Both buses shall perform the following sequences in parallel: (a) Transmit the data word; and (b) Perform receive sequence.

Interrupt Sequence. The MIC 10 determines the interrupt type after decoding the received message. The four types of interrupt decode are normal echo, attention echo, no echo and bad echo.

Normal Echo Sequence. The MIC 10 performs the normal echo sequence when bits 16 through 20 (Function Code) of the received message indicate a normal echo. Once the message is validated, the following sequence occurs: (a) Set interrupt request line low; (2) Begin decrementing IATC register; (3) Set Status Register bits 3,6,7,8,9,10,11 low; (4) Monitor interrupt acknowledge line until it is asserted low by the microprocessor 20 or an IATC register time-out occurs; (5) If interrupt acknowledge line goes low, the auto vector select (AVSEL/) line is read; (a) If AVSEL/ is high, then interrupt request is tri-stated and bus monitor sequence is resumed; and (b) If AVSEL/ is low, then the contents of the base vector interrupt register is placed on the data lines D7 through D0 and the bus monitor sequence is resumed; (6) If IATC time-out occurs, interrupt request line shall be tri-stated and the No Command sequence shall be executed.

Attention Echo Sequence. The MIC 10 performs the attention echo sequence when bits 16 through 20 (Function Code) of the received message indicates an attention echo. The attention echo sequence is the same as the normal echo sequence except for the following: (1) Status Register bits 3,6,7,8 and 11 are reset. Status Register bit 10 is set; and (2) The base vector value (fetched from the base vector interrupt register) is incremented by one before being placed on the data lines D7 through D0.

No Echo Sequence. The MIC 10 performs the no echo sequence when a NRTC register time-out occurs. The no echo sequence is the same as the normal echo sequence except for the following: (1) Status Register bits 10 and 11 are set and reset respectively. Status Register bits 3,6,7,8 and 9 will remain in their current state; and (2) The base vector value (fetched from the base vector interrupt register) is incremented by two before being placed on the data lines D7 through D0.

Bad Echo Sequence. The MIC 10 performs the bad echo sequence when a block compare error occurs or a message is received in the buffer, but the message is not a valid message (invalid function code). The bad echo sequence is the same as the normal echo sequence except for the following: (1) Status Register bits 10 and 11 are set. Status Register bits 6,7,8 and 9 remain in their current state. Status Register bit 3 is set/reset according to block compare condition; and (2) The base vector value (fetched from the base vector interrupt register) is incremented by three before being placed on the data lines D7 through D0.

Master/Alternate Communication. The master bus controller 16 and the alternate bus controller 22 may communicate with each other by transmitting any data word as long as it has the other's module ID in the 6 most significant bits of the data word. The other 26 bits may contain any information. The transmitting controller may set the broadcast bit (Set-up Register bit 4) to indicate no echo is expected. The master/alternate communication sequence is as follows: Master/Alternate (transmitting device): (1) Fetch message from Transmit Buffer; (2) Add sync and parity to format the message; (3) Manchester encode and transmit the message; (4) Repeat 1-3 until the Transmit Buffer is empty; and (5) Begin bus monitoring sequence. Alternate/Master (receiving device): (1) Perform regular receive sequence; and (2) The microprocessor 20 may access the message by reading the Receive Buffer and masking off the 6 most significant bits of the message.

During the initialization routine, the microprocessor 20 loads the Bus Time-out Constant (BTC), the No Command Time-out Constant (NCTC), the No Response Time-out Constant (NRTC), the Interrupt Acknowledge Time-out Constant (IATC), the Set-up Register and the Base Vector Number into the MIC's internal memory 42. This value is then loaded into a timer/counter by the MIC 10 and is used to determine serial bus control (master PIM or alternate PIM control) and which device will initiate serial bus activity. The BTC of the bus 30 controller 16 is always less than the alternate Bus Controller's BTC at power up to insure that the bus controller 16 always gets control of the bus 12 first. When a Bus Time-out occurs, the MIC 10 repeatedly sends an "I'm Alive" message (Sync, FFFFFFFFH, Parity) until a command is received from the μP 20 or the No Command Time-out occurs. The alternate Bus Controller 18 sees the serial bus activity, resets its bus timer/counter and continues to monitor bus activity. This is done by the MIC's internal hardware. This operation allows the Bus Controller 16 to keep control of the serial bus 12.

Under normal operation, the microprocessor 20 issues at least one command before a No Command Time-out occurs. When the MIC 10 receives a command, the No Command Time-out counter is reset by the MIC's internal hardware, the command is executed, and the Bus Time-out counter is reset. The MIC 10 then monitors the bus activity and waits for another Bus Time-out. If for any reason the microprocessor 20 cannot communicate with the MIC 10, the NO Command Time-out will occur and the Bus Controller's MIC 20 doubles its BTC automatically. The MIC 10 then monitors but activity and waits for another Bus Time-out. The alternate Bus controller 18 will than take control of the bus 12 since its MIC's BTC is smaller (it will time-out before the Bus Controller 16 does and it will begin sending "I'm Alive").

Remote Switch Mode Operation

Figure 10:
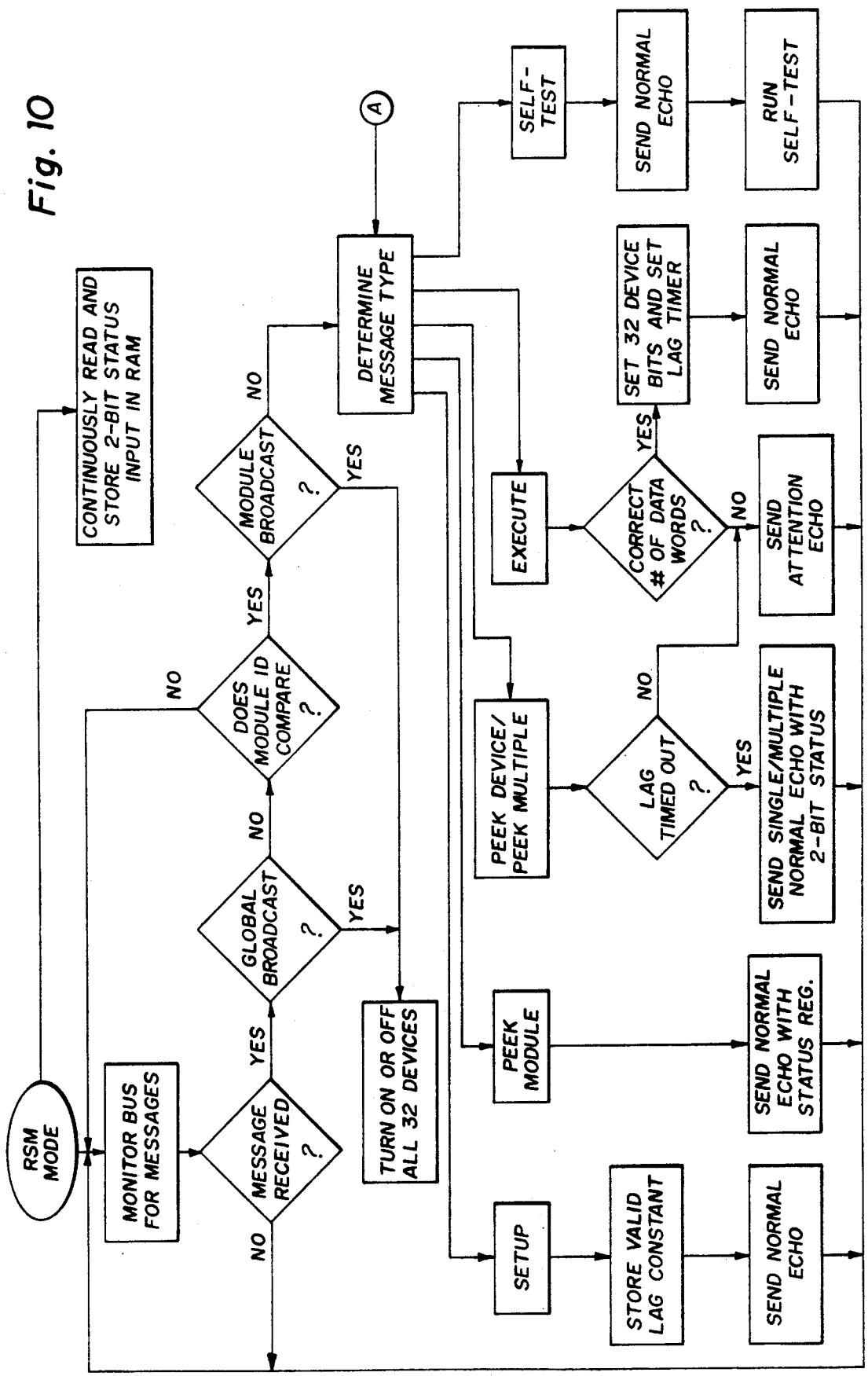
FIG. 10 is a flow chart illustrating the operation of the interface chip device of the present invention in its remote switch mode.

As previously mentioned, in Remote Switch Mode (RSM), the 32 data I/O pines (D[31:0]) are used as discrete output control signals to turn of/off 32 different devices. The address I/O pins (A[4:0]) are used as outputs to address up to 32 devices for loading the 2-bit status input (STAT[1:0]) into the MIC's internal RAM 42. In addition, ADLD/ is used to indicate a valid address is on the address bus. FIG. 10 shows a general microprogram flow chart of the Remote Switch Mode operation.

As shown in FIG. 5, additional multiplexers 64 and tri-state driver/receivers 66 may be used to interface the MIC 10 to other devices (solid state circuit breakers, ADC, DAC, etc.). This general interface is herein referred to as a MEPCAM Interface Module (MIM).

For example, the MIM 68, solid state circuit breakers or power controllers 70, and some support equipment may be configured to act as the Remote Switch Module 24 which controls the power to one or more loads. In Remote Switch Mode, the MIC 10 interfaces the bus 12 to the solid state circuit breakers 70. The RSM 24 receives commands (Set-up, Execute, Self test and Peek) from the BUS Controller 16 (or the alternate Bus Controller 18) and transmits echoes (Normal or Attention) back to the Bus Controller 16 or 18.

Single Device Commands: The following illustrates single device commands and responses between the bus controller 16 and an RSM 24.

The Bus Controller 16 first sends a set-up command.

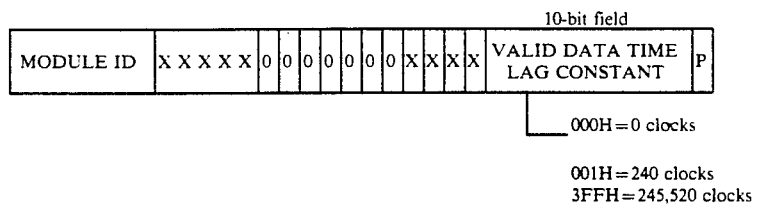

The set-up command contains a valid data time lag constant. This time constant is the amount of time the loads need to stabilize (worst case). If a Peek Single Device command occurs, the return status will reflect a Peek Device Busy until the time constant times out. This features prohibits the bus controller 16 from requesting device status information before the devices' status is valid. RSM 24: If no error is detected, the RSM 24 will send back a set-up normal echo.

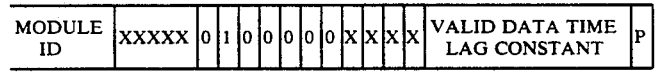

Bus Controller 16: Next, the Bus Controller 16 may issue an execute command telling the remote module 24 to turn on or off a specific device. The command word will be followed by a 32-bit data word.

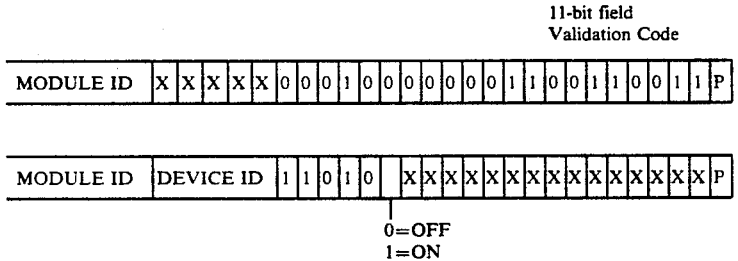

RSM 24: If no error is detected, an RSM 24 will transmit an execute normal echo.

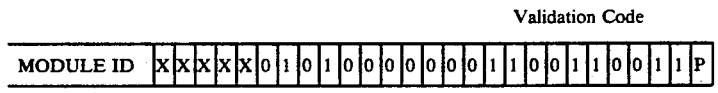

After beginning the execute normal echo, the MIC 10 begins executing the command. DATA I/O pins with the appropriate on/off bit pattern (determined by the DEVICE ID and the ON/OFF bit in the data word) will be internally latched and sent. In a single device operation, only one Data output line changes, the other 31 Data output lines will stay as previously defined. The RSM 24 continuously reads all status bits. The 2-bit status inputs (STAT[1:0])) are saved in memory 42 and are made available to the Bus Controller 16 when a Peek Single/Multiple Device command is issued.

RSM 24: If the received validation code does not match with the fixed value 333H or the number of data word received is not equal to the word count, the RSM 24 will send an execute attention echo.

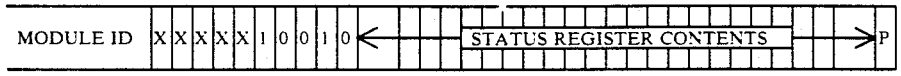

No execution will be performed.

If a parity or Manchester error is detected on either block, the command message is ignored and no echo will be sent back. The block compare check error bit (bit 3) is set high when the block compare check fails. No echo will be sent back on a block error.

The Bus Controller 16 may issue a Peak Single Device command to check the status inputs (STAT[1:0]).

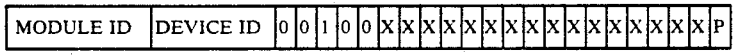

The RSM 24 returns a Peak Single Device normal echo.

The RSM 24 returns a Peek Single Device normal echo.

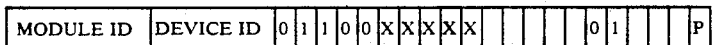

Address of last device indicating STAT = 01
CONTROL BIT
Input STAT[1]
Input STAT[0]

The RSM 24 returns a Peek Single Device attention echo if the valid data time lag constant has not timed out.

The Bus Controller 16 may also issue a peak module command to check the MIC's internal status.

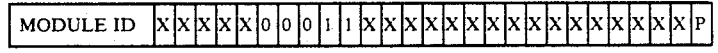

The RSM 24 returns a peek module normal echo.

Multiple Device Commands: The Bus Controller 16 can issue multiple device commands to turn on/off more than one data line (device) at a time. The following illustrate multiple device commands and responses between the Bus Controller 16 and an RSM 24.

Execute Command with Multiple Data Words. The Bus Controller 16 may issue an execute command. The command word will be followed by (n+1) 32-bit data words will tell the remotely located MIC 10 to turn on or off (n+1) data lines respectively.

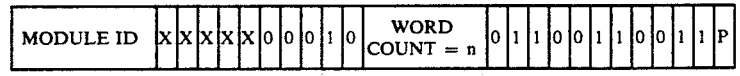

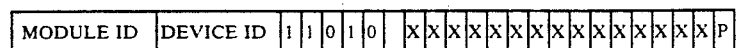

0 = OFF
1 = ON

-continued

| MODULE ID | DEVICE ID | 1 | 1 | 0 | 1 | 0 | X | X | X | X | X | X | X | X | X | X | X | X | X | X | P |

0 = OFF
1 = ON

RSM 24: If no error is detected, the RSM 24 will transmit an execute normal echo.

| MODULE ID | X | X | X | X | 0 | 1 | 0 | 1 | 0 | WORD COUNT = n | 0 | 1 | 1 | 0 | 0 | 1 | 1 | 0 | 0 | 1 | 1 | P |

After beginning the execute normal echo, the MIC 10 will then execute one data output cycle to set or reset the new data line values.

RSM 24: If the received validation code does not match with the fixed value 333H or the number of data word received is not equal to the word count, the RSM 24 will send and execute attention echo.

| MODULE ID | X | X | X | X | 1 | 0 | 0 | 1 | 0 | ← STATUS REGISTER CONTENTS → | P |

No execution will be performed.

Peek Multiple Device Command. The bus controller 16 may issue a Peek Multiple Device Command to request a block of data from a single Remote Module. The number of devices (n) to check is sent in the command word. The Remote Module 24 will return "n" echos, starting at device 1, to the bus controller 16. In RSM mode, the Remote Module 24 will send back the status inputs (STAT[1:0]) from device 1 to device n+1. The bus controller 16 will place all of the valid echos in its Receive Buffer and then will generate a single interrupt request (INTREQ/ asserted low). When the bus controller 16 sets the transmit bit (bit 0 of the Set-up Register), it must also set the peek multiple devices bit (bit 7 of the Set-up Register) to indicate that the bus controller 16 should expect multiple choices.

Bus Controller 16 issues a Peek Multiple Device Command for information from "n" devices. The "number of devices to check" field is a 5-bit field; 0000=1 device, 00001=2 devices, ..., 11111=32 devices.

| MODULE ID | X | X | X | X | X | 0 | 0 | 0 | 0 | 1 | X | X | X | X | X | X | X | X | X | X | P | number of devices to check

The RSM 24 will respond with the status input information for "n" devices starting at device 1.

The RSM 24 will respond with the status input information for "n" devices starting at device 1.

| MODULE ID | 0 | 0 | 0 | 0 | 0 | 0 | 1 | 0 | 0 | 1 | X | X | X | X | X | | | | | 0 | 1 | | | | P |

Address of last device indicating STAT = 01
CONTROL BIT
Input STAT[1]
Input STAT[0]

| MODULE ID | 0 | 0 | 0 | 0 | 1 | 0 | 1 | 0 | 0 | 1 | X | X | X | X | X | | | | | 0 | 1 | | | | P |

Address of last device indicating STAT = 01
CONTROL BIT
Input STAT[1]
Input STAT[0]

| MODULE ID | DEVICE n | 0 | 1 | 0 | 0 | 1 | X | X | X | X | X | | | | | 0 | 1 | | | | P |

Address of last device indicating STAT = 01
CONTROL BIT
Input STAT[1]
Input STAT[0]

Figure 7:
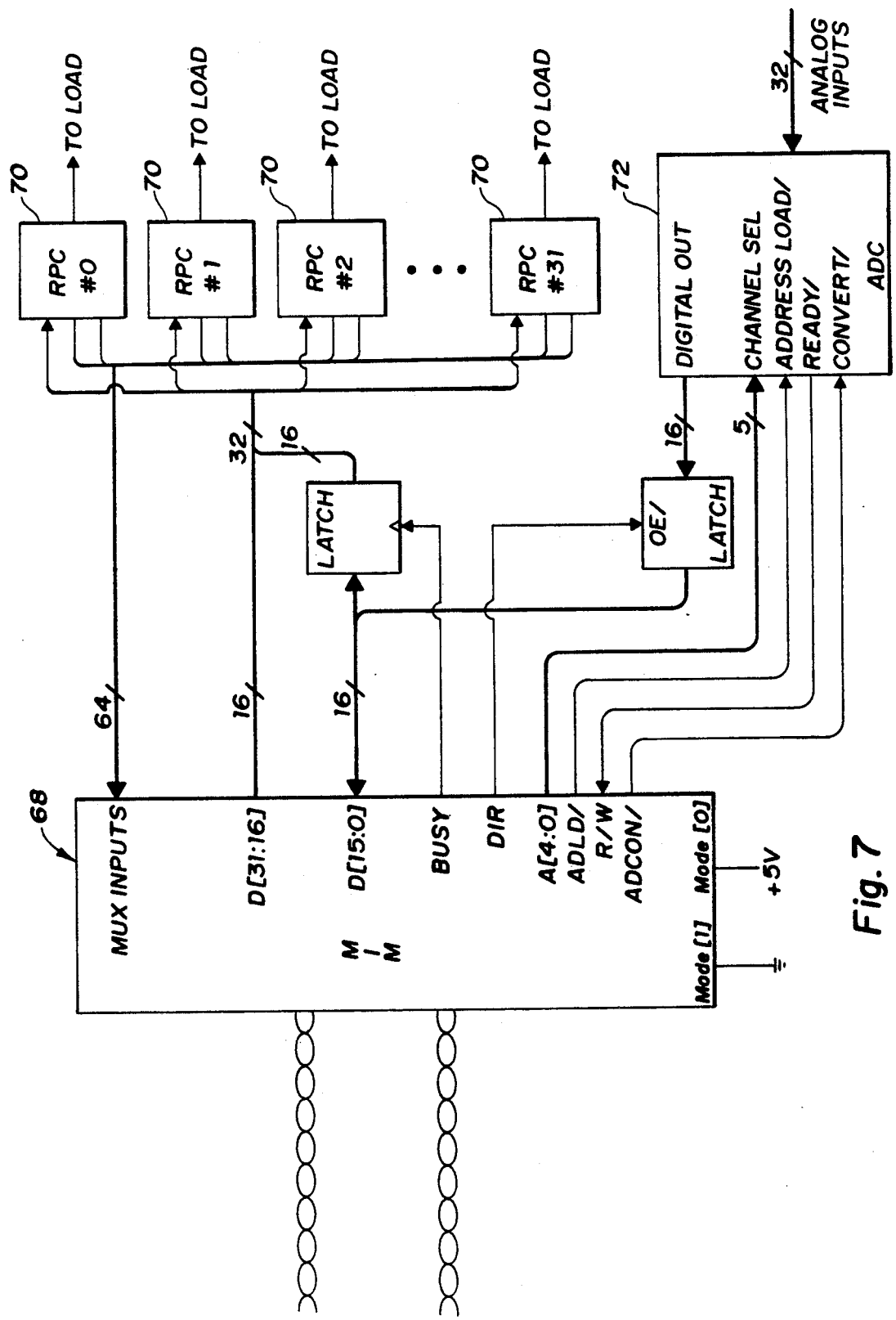
FIG. 7 is a schematic block diagram of the MIM of FIG. 4 in a combined remote switching mode and data input mode.

Global Broadcast Channels are used to either turn on or off all D[31:0] outputs on all remote modules operating in RSM or a RSM/DIM Combination Mode as illustrated in FIG. 7. The following illustration shows a global broadcast command. No response is expected from the remote modules with this type of command.

mand and its responses between the Bus Controller and a remote module.

The Bus Controller 16 sends a self-test command to a remote module.

| MODULE ID | X | X | X | X | X | 0 | 0 | 1 | 0 | 1 | X | X | X | X | VALIDATION CODE | P |

Bus Controller 16 sends a global broadcast "on" command.

The Remote Module 24 sends a self-test normal echo to acknowledge the reception of the self-test command.

| X | X | X | X | X | X | X | X | X | X | X | 1 | 1 | 0 | 0 | 0 | X | X | X | X | VALIDATION CODE | P |

Note: The module ID is ignored, therefore no echos will be issued by the remote modules.

In broadcast execute operation, the MIC outputs

| MODULE ID | X | X | X | X | X | 0 | 1 | 1 | 0 | 1 | X | X | X | X | VALIDATION CODE | P | either 00000000H to turn off all 32 data lines or FFFFFFFFH to turn on all 32 data lines. Only one data output cycle is performed.

Module Broadcast Commands are used to either turn on or off all devices on a specific remote module operating in RSM or RSM/DIM Combination Mode. The following illustration shows a module broadcast command. No response is expected from the remote module with this type of command. This command is valid for MICs in Remote Switch Mode only for RSM/DIM Combination Mode.

The Bus Controller 16 sends a module broadcast "on" command.

The remote module such as module 24 will start its self-test if no error has occurred. The data line outputs remain unchanged. If the received validation code does not match with the proper fixed value, the remote module will send a self-test attention echo and ignore the command.

| MODULE ID | X | X | X | X | 1 | 0 | 1 | 0 | 1 | STATUS REGISTER CONTENTS | P |

The Bus Controller 16 may issue a Peek Module Command after the self-test command in order to obtain the results of the self-test and status of the remotely located MIC 10.

| MODULE ID | X | X | X | X | X | 0 | 0 | 0 | 1 | 1 | X | X | X | X | X | X | X | X | X | X | X | X | X | X | P |

The Remote Controller 24 returns a Peek Module Normal Echo with the remotely located MIC's internal status.

| MODULE ID | X | X | X | X | X | 1 | 1 | 0 | 1 | 1 | 0 | 0 | 0 | 0 | 0 | VALIDATION CODE | P |

Note: no echo will be issued by the remote module.

| MODULE ID | X | X | X | X | X | 0 | 1 | 0 | 1 | 1 | STATUS REGISTER CONTENTS | P |

In broadcast execute operation, the MIC 10 outputs either 00000000H to turn off all 32 data lines or FFFFFFFFH to turn on all 32 data lines. Only one data output cycle is performed.

Figure 11:
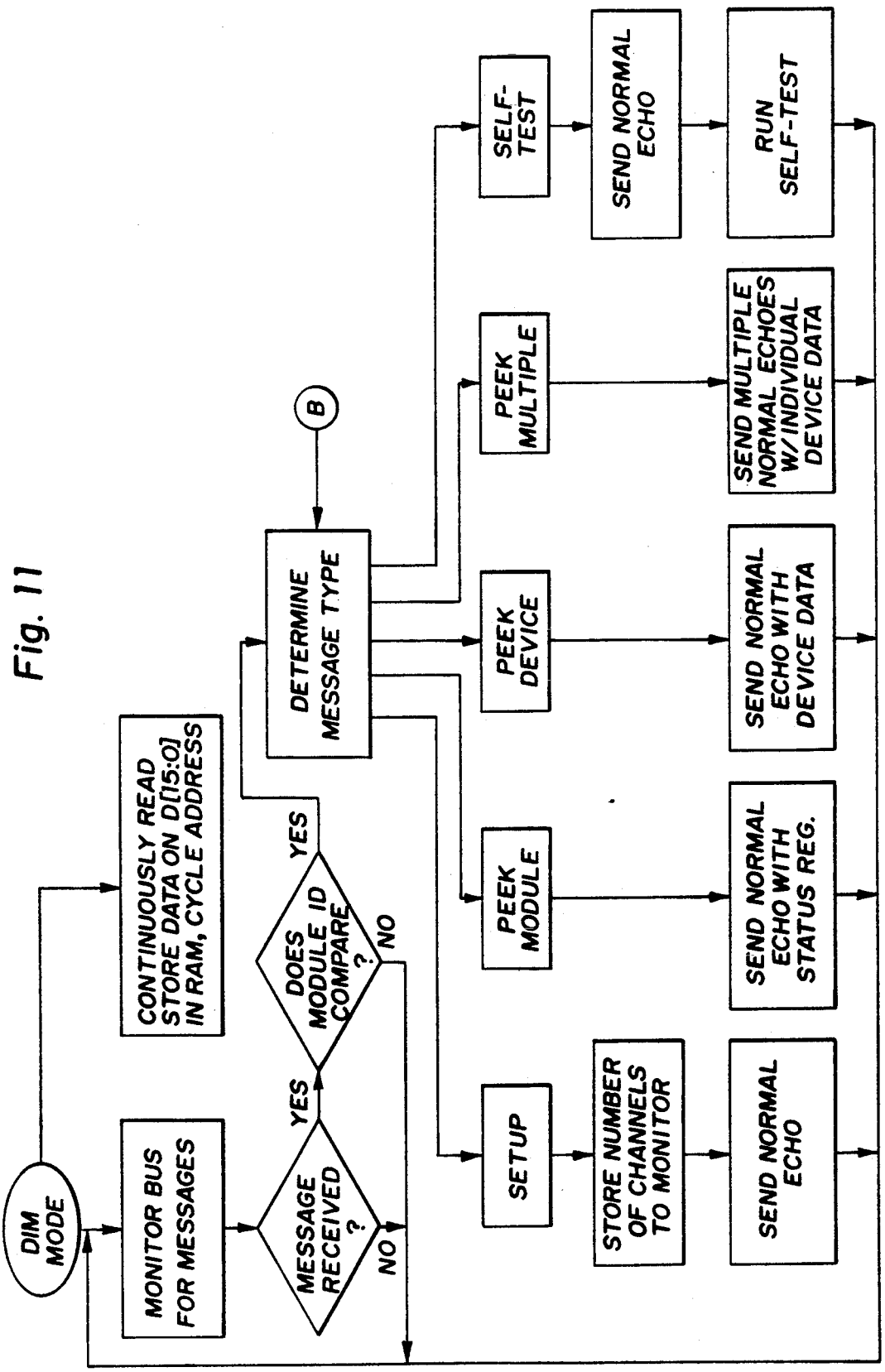
FIG. 11 is a flow chart illustrating the operation of the data chip device in its data input mode.
Figure 12:
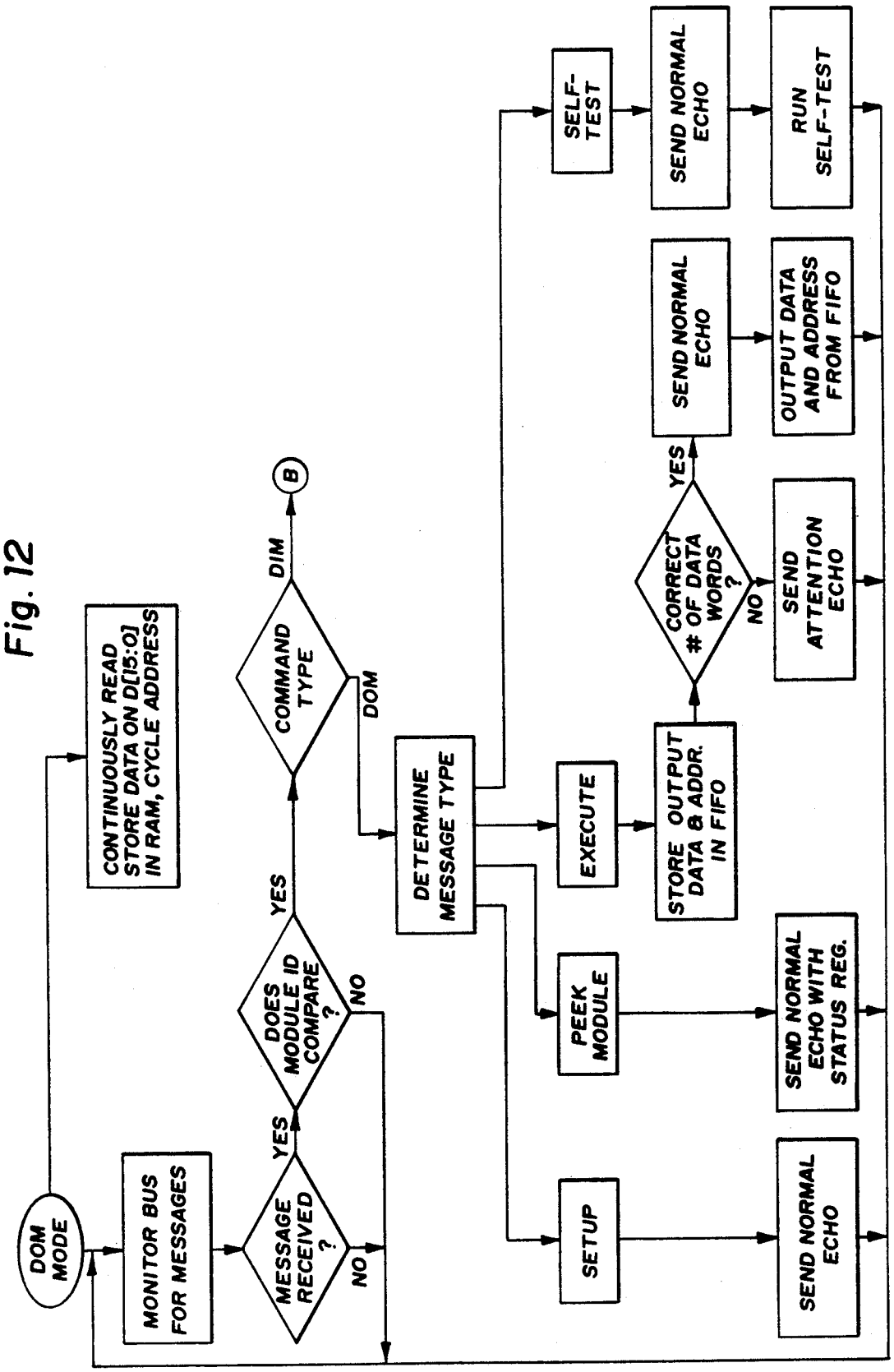
FIG. 12 is a flow chart illustrating the interface chip device in its data output mode.

A Self-Test Command can be issued by the Bus Controller 16 to instruct any remote module to a run self-test. The following example illustrates the self-test com- Data Input Mode In Data Input Mode (DIM), the MIC 10 interfaces the bus 12 to any device providing a digital format. In this mode, the MIC 10 constantly monitors all 32 channels as illustrated in the lower right hand portion of FIG. 6. Digital data is saved in the internal RAM 42. The data is available to the Bus Controller 16 via a Peek Single Device command. FIG. 11 illustrates a DIM flowchart.

The DIM 26 returns a Peek Single Device normal echo.

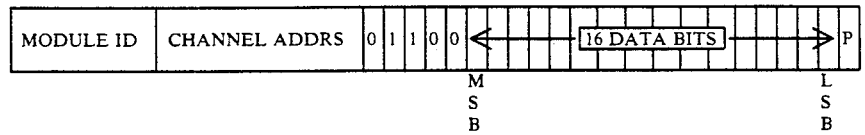

Figure 6:
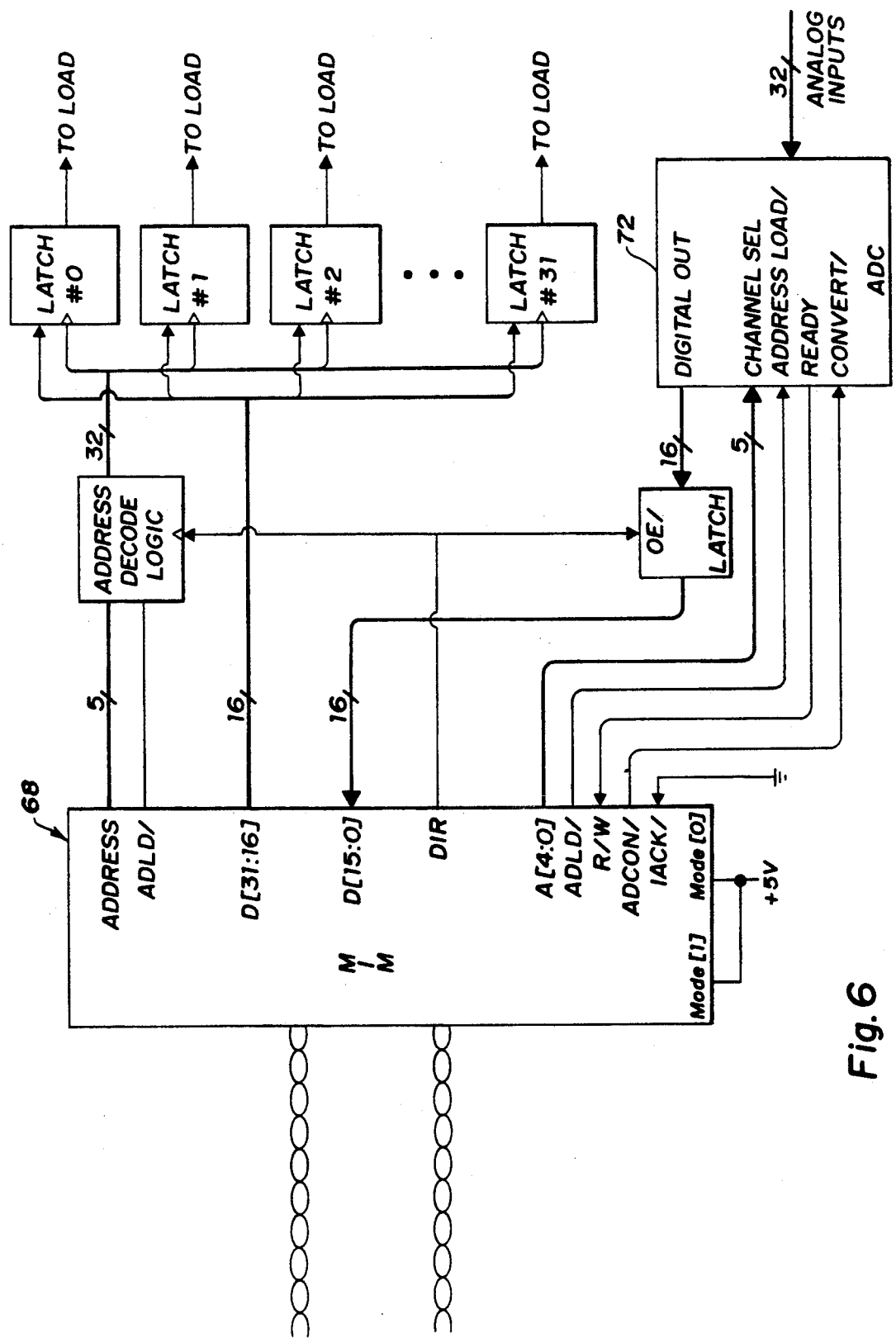
FIG. 6 is a schematic block diagram of the device of FIG. 5 (i.e. MIM) in a combined data input mode and data output mode.

Using the Data Input Mode, the MIC 10 interfaces the bus 12 to any device driving a digital output (A/D converters 72 for example). The 16 data I/O) lines (D [15:0]) are used as inputs to read the 16-bit digital data. Address I/O pins (A[4:0]) are used as outputs to address up to 32 channels. The MIC 10 cycles through all the channels and loads the digital data into the RAM 42 continuously. The ADLD/ signal is an output used to indicate the address signals are valid. The ADCON/ signal is used to initiate conversion if A/D converters are used and R/W is used as an input signal to indicate the data on the data bus is valid as shown in FIG. 6. The MIC 10 places the channel address on the address bus A[4:0] and asserts ADLD/ low. The MIC 10 then issues a convert signal ADCON/ and waits for a data valid response on the R/W pin. When using the A/D converter 72, R/W is high during conversion and is asserted low by the ADC 72 to indicate conversion is complete. The digital data is then read off the data bus and placed in a specific RAM location (location reflects address of specified channel). The address is decremented and the cycle repeats. The MIC 10 begins with the highest address (1Fh), decrements to the lowest (00h) and then begins at the highest address again. The Bus Controller 16 may access the data via a Peek Single Device Command. When a Peek Single Device Occurs, the Mic 10 finishes its current process, selects the Ram location (location reflects the address of specified channel) and transmits the data in that location to the Bus Controller 16.

The Bus Controller 16 sends a Peek Single Device command.

The Bus Controller 16 can also issue a set-up command to specify the number of channel(s) to monitor. The 5 least significant bits can be used to short cycle the number of channels sampled. The Bus Controller 16 can insert a number less than 32 to utilize this feature. The MIC 10 will default to 32 if no set-up command is issued.

The Bus Controller 16 issues a set-up command.

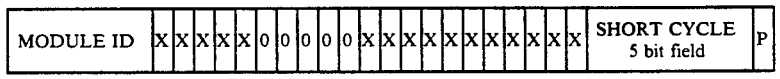

If no error is detected, the DIM 26 will send back a set-up normal echo.

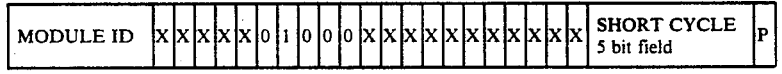

Peek Multiple Device Command

The bus controller 16 may issue a Peek Multiple Device Command to request a block of data from the Remote Module 26. The number of devices (n) to check is sent in the command word. The Remote Module will return "n" echos, starting at device 1, to the bus controller 16. In DIM mode, the Remote Module 26 will send back the data line inputs (D[15:0]) from device 1 to device n+1. The bus controller 16 will place all of the valid echos in its Receive Buffer and then will generate a single interrupt request (INTREQ/ asserted low). When the bus controller 16 sets the transmit bit (bit 0 of the Set-up Register), it must also set the peek multiple devices bit (bit 7 of the Set-up Register) to indicate that the bus controller 16 should expect multiple echos.

The Bus Controller 16 issues a Peek Multiple Device Command for information from "n" devices. The "number of devices to check" field is a 5-bit field; 00000=1 device, 00001=2 devices, . . . , 11111=32 devices.

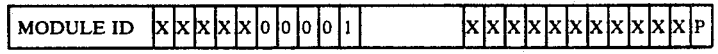

number of devices to check

The module 26 will respond with the data line inputs information for "n" devices starting at device 1.

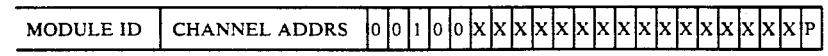

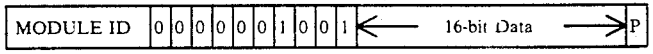

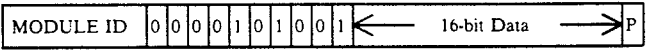

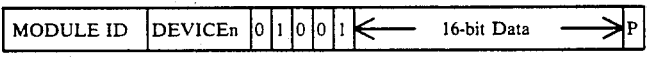

Data Output Mode Operation

The Data Output Mode is automatically combined with Data Input Mode for remotely located MIC's hard-wired for the Data Output Mode base operation mode as illustrated in FIG. 6.

The Data Output Mode has priority over the Data Input Mode. When a DOM command is received by the MIC 10, its stops reading in the data lines (DIM operation) and begins to drive the bus 12 until it has finished output all of the received data words. The output cycle begins after the ADCON/ signal is asserted of the current DIM cycle. In essence, DOM performs a cycle stealing operation because it uses the converting time between an ADCON/ (DIM convert signal) and R/W (DIM-ADC ready signal) to output the information. For general applications, the DOM base operation mode interfaces the bus 12 to devices that accept digital information. The information may then be converted to analog forms by means for a digital to analog converter (DAC) as illustrated at 76 in FIG. 8, pulse width modulator (PWM) as illustrated at 78 in FIG. 8, or step motor drive (SMD) as illustrated at 80 in FIG. 8.

The 16 data I/O pins (D[31:15]) are used as outputs. Address I/O pins (A[4:0]) are used as outputs to address up to 32 devices. In addition, ADLD/ is used to indicate the address signals are valid. The IACK/ signal is used as an input that indicates the external device has read the current data word and is ready for the next data word. This signal may be held low to disable the handshaking feature provided by handshake interface 58. If INTREQ/ is held low, multiple data words are placed consecutively in the data bus 12 in the order they were received.

The following and FIG. 6 illustrate the data output mode operation between the Bus Controller 16 and a remotely located MIC 10 in Data Output Mode.

The Bus Controller 16 issues an execute command. The command word will be followed by (n+1) 32-bit data words:

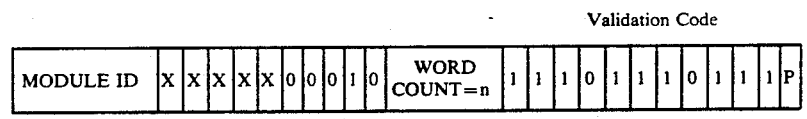

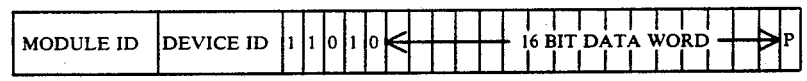

If no error is detected, the DOM (i.e. 28–32) will transmit an execute normal echo and then proceed to writing data to the device(s) specified by the Bus Controller 16.

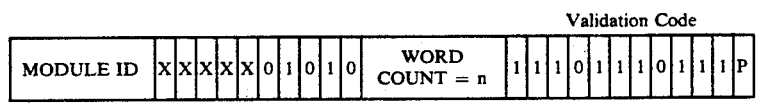

If the received validation code does not match with the fixed value 777H, or the number of data word received is not equal to the word count, the DOM will send an execute attention echo.

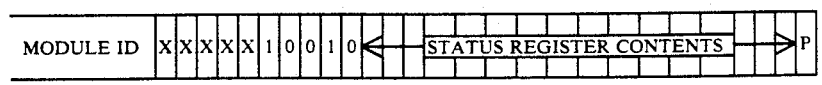

No execution will be performed.

As illustrated in FIG. 11, the DOM peek module procedure is the same as the RSM peek module procedure with the exception of the command word format.

RSM/DIM Combination Mode

Figure 13:
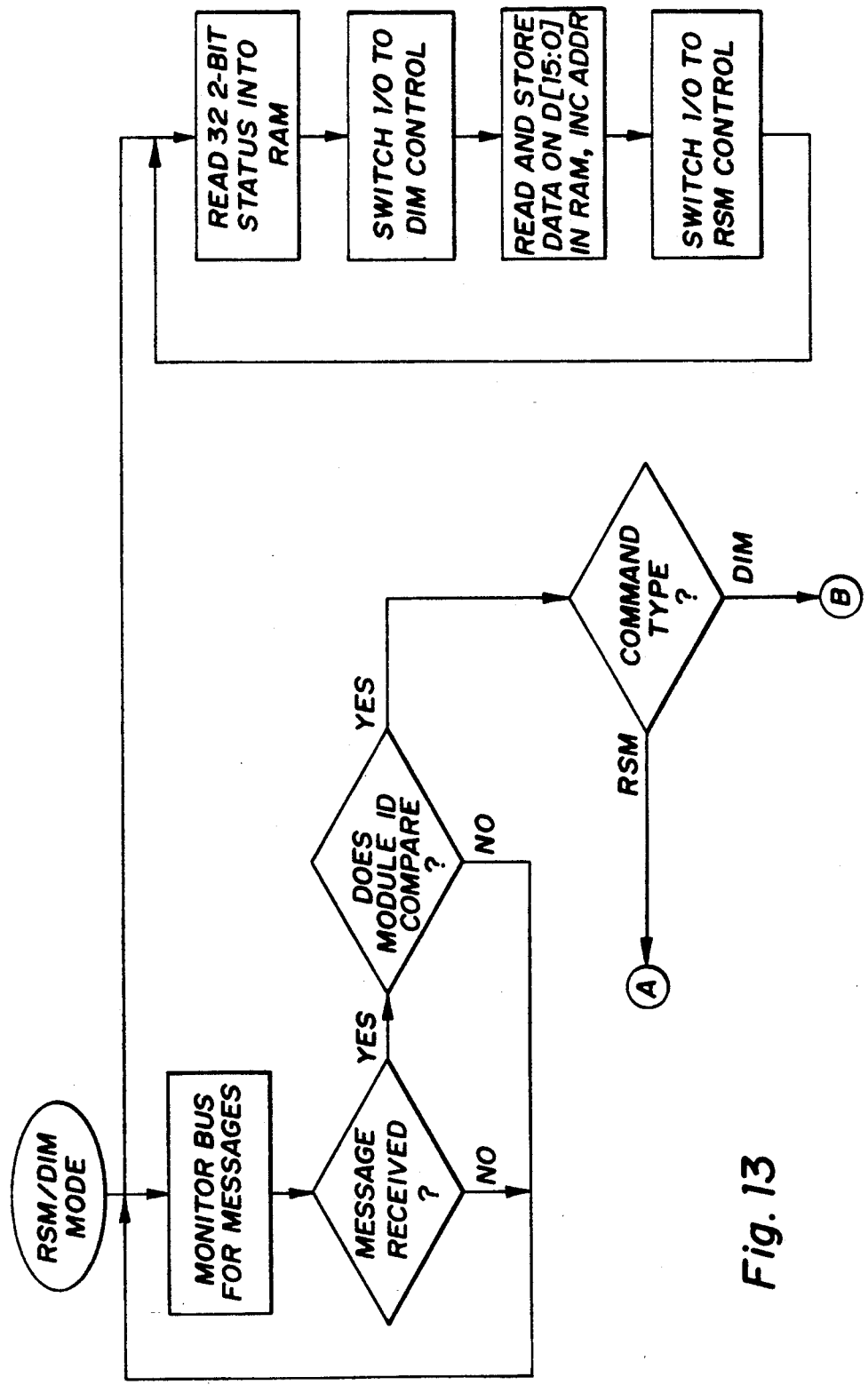
FIG. 13 is a flow chart illustrating the interface chip device in its combined remote switching mode and data input modes.

RSM/DIM Combination Mode is illustrated in FIGS. 7 and 13 and is enabled by setting bit 15 in a Set-up command and sending the command word to a remote module that is hardwired for RSM mode. The valid data time lag constant (for RSM mode) is sent in the same command word.

The Bus Controller 16 issues a Set-up command with the valid data time lag constant.

The number of channels to monitor for DIM mode may be configured by sending a second set-up command (with bit 15 set).

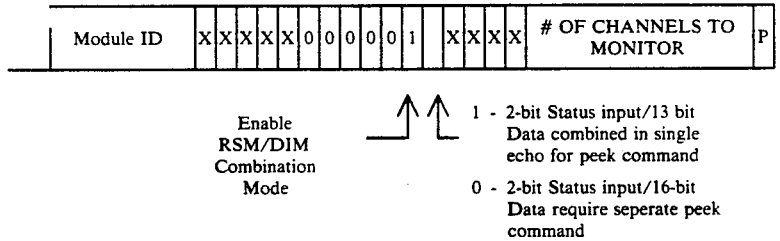

The command word must contain the correct validation code.

In both cases of the set-up command, bit 14 indicates the format of a peek device normal echo.

Single Device Commands

The Bus Controller 16 issues a Peek Single Device Command.

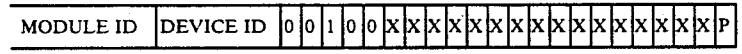

If the last set-up command had BIT 14 set, then the RSM/DIM will respond with a peek single device normal echo with RSM data (2-BIT status input and control bit) and DIM data (13 bits LSB).

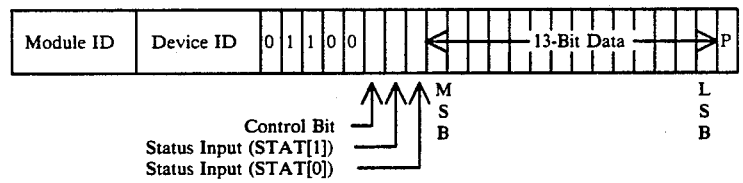

OR

If the last set-up command had bit 14 reset, then RSM/DIM will respond with a peek single device normal echo with RSM data only.

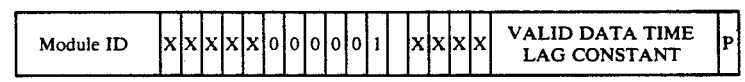

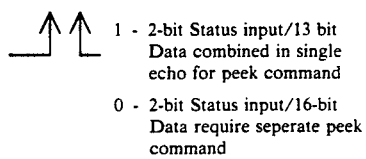

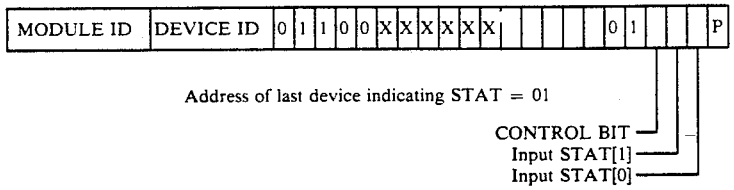

If the valid data time lag constant has not timed out, the RSM/DIM returns a peek single device attention echo.

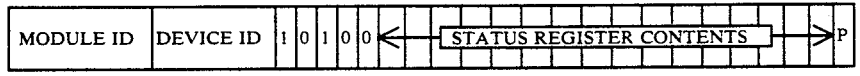

The RSM/DIM combination mode requires a special command to acquire the data from the DIM operation of the combined mode if the combined data format is not being used (bit 14 of the Set-up command is reset). This command is used to send back the 16-bit/address input data located in the MIC's internal RAM 42. The DIM operation in combined mode works the same as in non-combined mode except a Peek Single Device Command—RSM/DIM and Peek Multiple Device Command—RSM/DIM are used instead of Peek Single Device Command and Peek Multiple Device Command for regular DIM non-combined operation. The functions of the commands are the same; however, the function code field in the command word is different. All of the RSM commands remain the same during combination mode when bit 14 of the Set-up command is reset.

While the best mode for carrying out the invention has herein been described in detail, those familiar with the art to which this invention relates will recognize various alternative designs and embodiments for practicing the present invention as defined by the following claims.

What is claimed is:

1. A single interface chip device for use in a time-division multiplex serial data bus system having a communications protocol, the device comprising:

first means for controlled information transfer between a processor and said data bus in a processor interface mode, wherein the communications protocol is transparent and includes a plurality of commands and wherein said first means includes means for determining the validity of each of the commands and providing an echo response message to the data bus in response thereto.

2. The device as claimed in claim 1 wherein the at least one I/O device includes at least one switching device and wherein said first means includes switching means for control of information transfer between the at least one switching device and said data bus in a remote switching mode.

3. The device as claimed in claim 2 wherein the at least one switching device is a power switching device.

4. The device as claimed in claims 1 or 2 wherein that at least one I/O device includes a plurality of data input devices and wherein said first means includes data input means for control of information transfer between the plurality of data input devices and said data bus in a data input mode.

5. The device as claimed in claim 4 wherein the data input devices include sensors.

6. The device as claimed in claims 1 or 2 wherein the at least one I/O device includes a plurality of data output devices and wherein said first means includes data output means for controlling information transfer between the plurality of data output devices and said data bus in a data output mode.

7. The device as claimed in claim 4 wherein the at least one I/O device includes a plurality of data output devices and wherein said first means includes data output means for control of information between the plurality of data output devices and said data bus in a data output mode.

8. The device as claimed in claim 6 wherein said data output device includes an output drive circuit.

9. The device as claimed in claim 7 wherein said data output device includes an output drive circuit.

10. The device as claimed in claim 1 wherein the echo response message to the data bus indicates the completion of each of the commands.

11. A single interface chip device for use in a time-division multiplex serial data bus system having a communications protocol which is transparent and has a plurality of commands, the device comprising:

first means for direct control of information transfer between an I/O device and said data bus in a plurality of remote modes including a switching mode, a data input mode and a data output mode; and second means for control of information transfer between a processor and said data bus in a processor interface mode wherein the first means includes means for determining the validity of each of the commands and providing an echo response message to the data bus in response thereto.

12. The device as claimed in claim 11 wherein the echo response message to the data bus indicates the completion of each of the commands.

13. The device as claimed in claim 11 wherein the first means directly controls information transfer between the I/O device and the data bus in a combined mode of two remote modes.

* * * * *

UNITED STATES PATENT AND TRADEMARK OFFICE
CERTIFICATE OF CORRECTION

PATENT NO. : 5,181,201

DATED : January 19, 1993

INVENTOR(S) : Craig A. Schauss et al.

It is certified that error appears in the above-identified patent and that said Letters Patent is hereby corrected as shown below:

Column 37, line 45
Claim 1, after "first" insert --means for controlled, direct information transfer between at least one I/O device and said data bus in at least one remote mode; and
second--.

Signed and Sealed this

Twelfth Day of April, 1994

*Attest:*

BRUCE LEHMAN

*Attesting Officer*

*Commissioner of Patents and Trademarks*